US010565640B2

(12) United States Patent
Poornachandran et al.

(10) Patent No.: US 10,565,640 B2
(45) Date of Patent: Feb. 18, 2020

(54) PROXIMITY-BASED INTER-COMPUTING DEVICE NEGOTIATION

(71) Applicant: INTEL CORPORATION, Santa Clara, CA (US)

(72) Inventors: Rajesh Poornachandran, Portland, OR (US); Douglas A. Dallmann, Portland, OR (US); Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 991 days.

(21) Appl. No.: 14/316,686

(22) Filed: Jun. 26, 2014

(65) Prior Publication Data

US 2015/0379624 A1 Dec. 31, 2015

(51) Int. Cl.
G06Q 30/08 (2012.01)
H04W 4/80 (2018.01)

(52) U.S. Cl.
CPC .............. G06Q 30/08 (2013.01); H04W 4/80 (2018.02)

(58) Field of Classification Search
CPC .............. G06Q 20/3278; G06Q 30/08; G06Q 30/0611; G06Q 30/06; G06Q 30/0601; H04W 4/008
See application file for complete search history.

(56) References Cited

U.S. PATENT DOCUMENTS 7,761,340 B2 * 7/2010 Yee .................... G06Q 30/0226
  705/26.1
7,813,968 B2 10/2010 Halcrow et al.
8,737,974 B1 * 5/2014 Sennett ................. G06Q 30/00
  705/26.3
8,755,824 B1 6/2014 Wang et al.
(Continued)

FOREIGN PATENT DOCUMENTS

EP 2575028 A2 4/2013
JP 2001-265958 9/2001
(Continued)

OTHER PUBLICATIONS

Frey, Hannes, Daniel Görgen, Johannes K. Lehnert and Peter Sturm. "Auctions in mobile multihop ad-hoc networks following the marketplace communication pattern." Wireless Information Systems (2004). (Year: 2004).*

(Continued)

Primary Examiner — A. Hunter Wilder
(74) Attorney, Agent, or Firm — Schwabe, Williamson & Wyatt, P.C.

(57) ABSTRACT

Embodiments are disclosed herein for inter-computing device negotiation. In some embodiments, a first computing device may determine that a second computing device is within a predetermined proximity of the first computing device, and may cause the transmission of negotiation initiation data to the second computing device in response to the determination. The first computing device may receive (Continued)

negotiation response data provided by the second computing device, and may determine that the negotiation response data meets negotiation evaluation criteria. In response, the first computing device may cause the transmission of a confirmation message to the second computing device. Other embodiments may be disclosed and/or claimed.

15 Claims, 12 Drawing Sheets

(56) References Cited

U.S. PATENT DOCUMENTS

| | | |
|---|---|---|
| 2010/0070380 A1 | 3/2010 | Park et al. |
| 2012/0176976 A1* | 7/2012 | Wells ............... H04W 52/0219 370/329 |
| 2012/0330784 A1 | 12/2012 | Nahidipour |
| 2013/0046609 A1 | 2/2013 | Grigg et al. |
| 2013/0137371 A1 | 5/2013 | Haverinen |
| 2013/0151366 A1* | 6/2013 | Godsey ................. G06Q 10/00 705/26.3 |
| 2013/0275311 A1 | 10/2013 | Kohn et al. |
| 2014/0087705 A1 | 3/2014 | Wooster et al. |
| 2014/0096179 A1* | 4/2014 | Ben-Shalom ....... H04L 63/0869 726/1 |
| 2014/0169795 A1* | 6/2014 | Clough ............... G06F 19/3418 398/106 |

FOREIGN PATENT DOCUMENTS

| | | |
|---|---|---|
| KR | 20020031589 A | 5/2002 |
| KR | 10-2012-0024135 A | 3/2012 |

OTHER PUBLICATIONS

Ayed, Hella Kaffel Ben, Faouzi Jaïdi and Ines Doghri. "Fairness and Access Control for Mobile P2P Auctions over MANETs." JTAER 7 (2012): 11-27. (Year: 2012).*

Partial European Search Report dated Dec. 15, 2015 for European Application No. 15166433.1, 10 pages.

Office Action dated Mar. 13, 2017 for Korean Patent Application No. 2016-7033131, 16 pages.

International Search Report and Written Opinion dated Aug. 31, 2015 for International Application No. PCT/US2015/031803, 13 pages.

International Preliminary Report on Patentability for International Application No. PCT/US2015/031803, 10 pages.

Extended European Search Report dated May 3, 2016 for European Application No. 15166433.1, 14 pages.

Article 94(3) dated Apr. 13, 2017 from European Patent Application No. 15166433.1, 5 pages.

Office Action dated Jan. 9, 2018 for Japanese Patent Application No. 2017-519209, 6 pages.

Office Action dated Sep. 27, 2017 for Korean Patent Application No. 2016-7033131, 5 pages.

Office Action dated Dec. 15, 2017 for Korean Patent Application No. 2016-7033131, 10 pages.

Office Action dated Jun. 14, 2018 for European Patent Application No. 15166433.1, 12 pages.

Office Action dated Jul. 29, 2019 for Chinese Paetnt Application No. 201580027542.0, 20 pages.

* cited by examiner

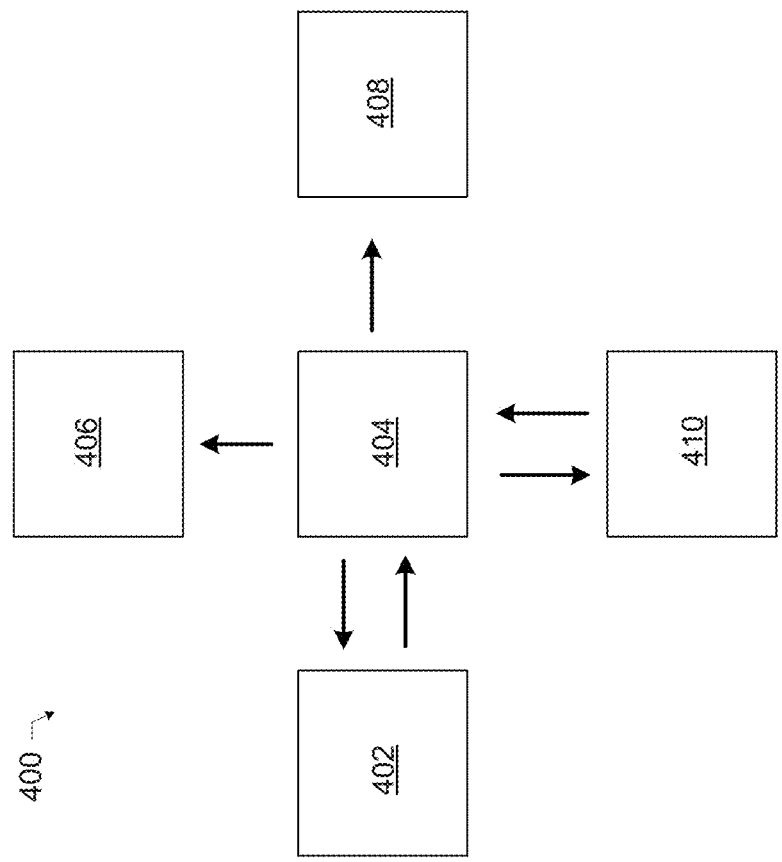
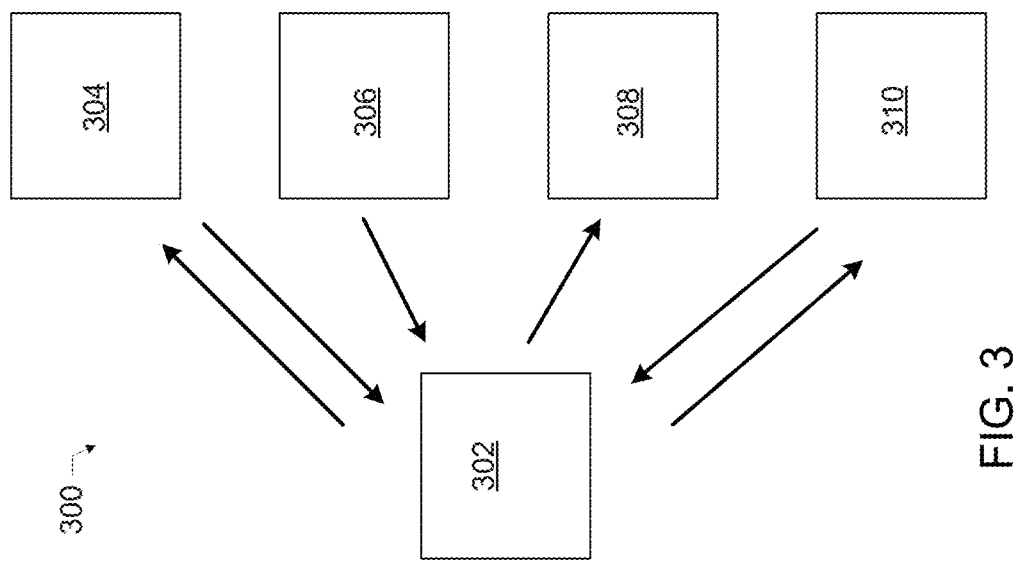

| DEVICE ID 502 | MOBILE123 | STORE45POS | DAVE'SGLASSES |
|---|---|---|---|
| NFC 504 | | | |
| BLUETOOTH 506 | | | |
| WiFi 508 | | | |
| OTHER 510 | | | |
| SGX 512 | | | |
| CSME 514 | | | |
| SE 516 | | | |
| OTHER 518 | | | |
| CONFIGURED TO NEGOTIATE 520 | | | |
| RESIDUAL ENERGY 522 | | | |
| ANTENNA STRENGTH 524 | | | |
| ORIGINATOR 526 | | | |
| MANAGER 528 | | | |
| NEGOT. INIT. DATA 530 | | | |
| NEGOT. INIT. DATA SENT 532 | | | |
| NEGOT. INIT. DATA CNFRM REC'D 534 | | | |
| NEGOT. RESPONSE DATA 536 | | | |
| NEGOT. EVAL. CRITERIA 538 | | | |
| NEGOT. EVAL. CRITERIA MET 540 | | | |

FIG. 5

Do you want to participate in negotiations? If yes, please select types below

☐ Travel
☐ Dining
☐ Clothing
☐ All

[ENTER]

FIG. 6

Would you like to initiate a negotiation? If yes, enter a description below, or scan a bar or QR code for the item that you'd like to negotiate over.

[CANCEL] [CONTINUE]

FIG. 7

Is this an offer to sell or an offer to purchase?

[SELL] [PURCHASE]

[CANCEL]

FIG. 8

Offer to Sell

Please enter the minimum acceptable price, if any.

$ _____

| 7 | 8 | 9 |
| 4 | 5 | 6 |
| 1 | 2 | 3 |
| 0 | . |   |

ENTER

FIG. 9

Please wait while we determine whether any proximate devices are able and interested in participating in this negotiation

FIG. 10

Three devices are participating. Please wait while their responses are received.

FIG. 11

Offer to Purchase

Please enter the maximum offer price, if any.

$ [____]

| 7 | 8 | 9 |
| 4 | 5 | 6 |
| 1 | 2 | 3 |
| 0 | . |   |

ENTER

FIG. 14

Offer to Purchase

Please enter the initial offer price, if any.

$ [____]

| 7 | 8 | 9 |
| 4 | 5 | 6 |
| 1 | 2 | 3 |
| 0 | . |   |

ENTER

FIG. 13

Congratulations! Mobile123 has met the negotiation criteria. Please enter a message for the winner here to arrange to complete the transaction.

[____]

ENTER

FIG. 12

You have been invited to a negotiation! Select this message for details

FIG. 15

A stand-by passenger would like to purchase your seat on Flight 405 to Denver. For how much would you be willing to sell your seat? Select this message for details on alternative flight options.

$ [    ]

[7] [8] [9]
[4] [5] [6]
[1] [2] [3]
[ ] [0] [.]

ENTER

FIG. 16

Thank you for your response. There is no need for you to give up your seat at this time.

RETURN

Thank you for your response. Please proceed to the gate counter to arrange transfer of your ticket and a later flight.

RETURN

Thank you for attending our demonstration of the Cheesemaster 9000. Would you like to bid on a new Cheesemaster 9000?

YES  NO

How much would you be willing to pay for a new Cheesemaster 9000? Select this message for additional product information.

$ _____

| 7 | 8 | 9 |
| 4 | 5 | 6 |
| 1 | 2 | 3 |
| 0 | . | |

ENTER

Would you like to make an offer on an item in this store? Please scan the barcode now, and enter the price you'd be willing to pay.

$

| 7 | 8 | 9 |
| 4 | 5 | 6 |
| 1 | 2 | 3 |
| 0 | . | |

ENTER

FIG. 23

Your bid is accepted! Please visit our website or proceed to the Customer Service Desk to claim your new Cheesemaster 9000.

RETURN

FIG. 22

Thank you for your response, but you are not the winner. Better luck next time!

RETURN

FIG. 21

The seller does not wish to negotiate over this item at this time, but thank you for your offer.

[RETURN]

FIG. 24

The seller accepts your offer. Please proceed to the point-of-sale terminal to complete your transaction.

[RETURN]

FIG. 25

The seller has proposed a counter-offer of $11.99. Do you accept this counter-offer?

[YES] [NO]

[COUNTER]

FIG. 26

PROXIMITY-BASED INTER-COMPUTING DEVICE NEGOTIATION

TECHNICAL FIELD

The present disclosure relates generally to the fields of data processing and data communication, and more particularly, to proximity-based inter-computing device negotiation.

BACKGROUND

Some existing Internet-based auction services allow a user to offer a product for sale, and to receive bids from remotely located other users. While such services may be useful to some users, such services may fail to provide opportunities for other kinds of negotiations that may be valuable for a user.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 3 and 4 illustrate two example negotiation communication topologies between different computing devices, in accordance with various embodiments.

FIG. 5 illustrates an example data structure that may be used to store negotiation data, in accordance with various embodiments.

FIGS. 6-26 depict various visual displays that may be presented on a display of a computing device during various negotiation scenarios and operations, in accordance with various embodiments.

DETAILED DESCRIPTION

Figure 2:
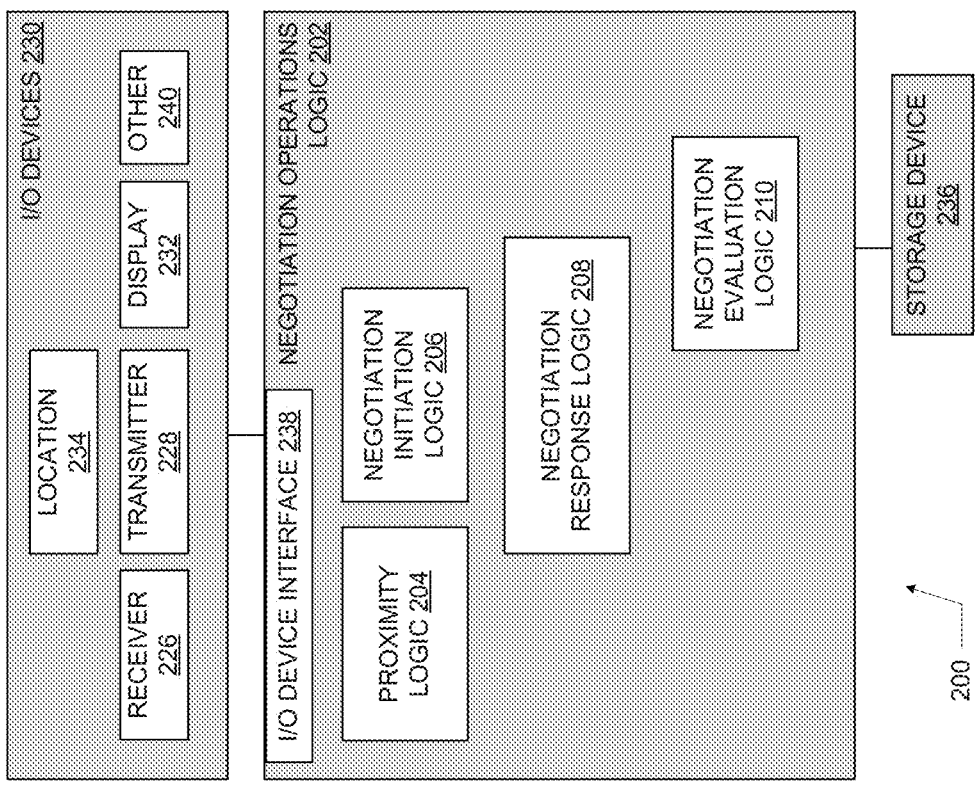
FIG. 2 is a block diagram of an illustrative computing device that may be implemented by the computing system of FIG. 1, in accordance with various embodiments.

Embodiments are disclosed herein for proximity-based inter-computing device negotiation. In some embodiments, a first computing device may determine that a second computing device is within a predetermined proximity of the first computing device, and may cause the transmission of negotiation initiation data to the second computing device, in response to the determination. The first computing device may receive negotiation response data provided by the second computing device, and may determine that the negotiation response data meets negotiation evaluation criteria. In response, the first computing device may cause the transmission of a confirmation message to the second computing device. For example, a first computing device may initiate negotiation with a second computing device, when the first computing device determines that the second computing device is within the boundary of a "shopping mall," "airport," or "school" geofence area. An example negotiation may include the negotiation of a sale or purchase of a product or service.

Various ones of the embodiments described herein provide mechanisms for real-time ad hoc auctioning between computing devices. As discussed in detail below, the computing devices may be any suitable computing devices. For example, in some embodiments, real-time ad hoc auctioning may take place between mobile devices and point-of-sale terminals. Mechanisms may be provided to ensure the communication between these computing devices is secure. Various embodiments of the systems and techniques disclosed herein may enable improved revenue for vendors when customers bid among themselves, improved prices for customers when a vendor is willing to sell a product at a lower price, more efficient connections between potential sellers and potential buyers, and an improved user experience for negotiation participants.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the phrase "coupled" may mean that two or more elements are in direct physical or electrical contact, or that two or more elements are not in direct contact with each other, but yet still cooperate or interact with each other (e.g., via one or more intermediate elements, which may perform their own transformations or have their own effects). For example, two elements may be coupled to each other when both elements communicate with a common element (e.g., a memory device). As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. As used herein, a signal may be "received" by a component if it is generated externally or internally to that component, and acknowledged and/or processed by that component.

Figure 1:
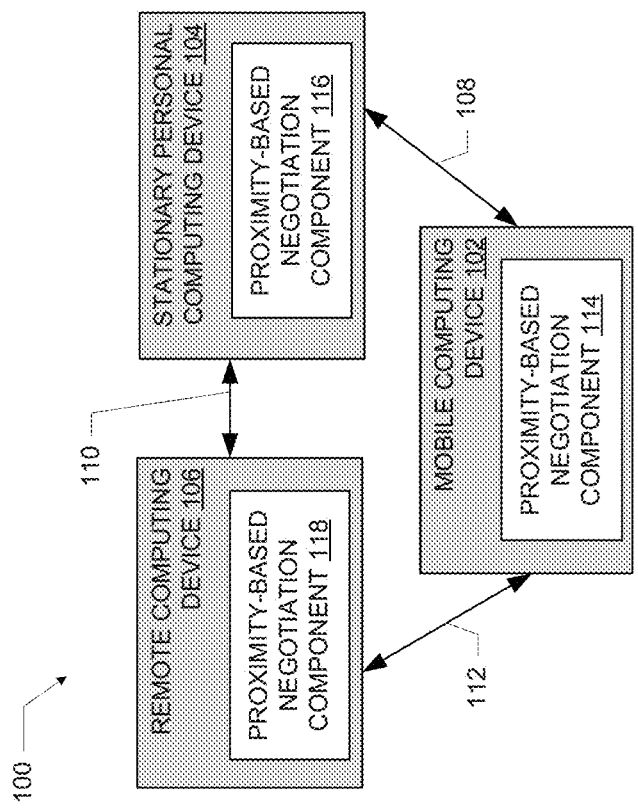
FIG. 1 is a block diagram of an illustrative computing system configured for proximity-based inter-computing device negotiation, in accordance with various embodiments.

FIG. 1 depicts an illustrative computing system 100 configured for proximity-based inter-computing device negotiation, in accordance with various embodiments. In some embodiments, a first computing device of the computing system 100 may be configured to determine that a second computing device is within a predetermined proximity of the first computing device, and to cause the transmission of negotiation initiation data to the second computing device, in response to the determination. The second computing device may be configured to provide a visual display of at least some of the negotiation initiation data in response to receiving the negotiation initiation data. The first computing device may receive negotiation response data provided by the second computing device, and may determine that the negotiation response data meets negotiation evaluation criteria. In response to the determination that the negotiation response data meets negotiation evaluation criteria, the first computing device may cause the transmission of a confirmation message to the second computing device. The first computing device may be the stationary personal computing device 104 or the mobile computing device 102 of the computing system 100. In some embodiments, the computing system 100 may include hardware configured to generate the data used by the first computing device to determine that the second computing device is within the predetermined proximity of the first computing device (e.g., Global Positioning System (GPS), Wi-Fi, Bluetooth, or Near Field Communication (NFC)-based location devices) and hardware to provide, receive, and evaluate negotiation-related data (e.g., a monitor for displaying a visual display of some of the negotiation-related data, an input device for receiving negotiation-related data from a user, and a communication device for exchanging negotiation-related data with other computing devices).

The computing system 100 may include a mobile computing device 102, a stationary personal computing device 104, and a remote computing device 106. Each of the mobile computing device 102, the stationary personal computing device 104, and the remote computing device 106 may include proximity-based negotiation components (illustrated in FIG. 1 as negotiation components 114, 116, and 118, respectively). Negotiation operations may be distributed between the negotiation components 114, 116, and 118 of the computing system 100 as suitable. Several examples of the distribution of operations between the components of the computing system 100 are discussed herein, but any other combination of more or less components and distribution of the operations may be used. In some embodiments, the computing system 100 may be configured as the computing device 200, discussed below with reference to FIG. 2.

Communication within the computing system 100 may be enabled by the communication pathways 108, 110, and 112. The communication pathways 108, 110, and 112 may each include wired communication pathways and/or wireless communication pathways, over direct couplings, and/or over personal, local, and/or wide area networks. Each of the mobile computing device 102, the stationary personal computing device 104, and the remote computing device 106 may include suitable hardware for supporting the communication pathways 108, 110, and 112, such as antennas, network interface cards, modems, Wi-Fi devices, Bluetooth devices, NFC devices, and so forth. In some embodiments, the communication pathways 108, 110, and 112 may be direct communication pathways between the components as illustrated in FIG. 1. As used herein, references to "direct" communication pathways between two components of the computing system 100 of FIG. 1 (or any system or device disclosed herein) may refer to a communication pathway that does not route through another illustrated component, but that may route through other non-illustrated devices (e.g., routers and/or switches).

Each of the computing devices included in the computing system 100 may include a processing device and a storage device (not shown). The processing device may include one or more processing devices, such as one or more processing cores, application specific integrated circuits (ASICs), electronic circuits, processors (shared, dedicated, or group), combinational logic circuits, and/or other suitable components that may be configured to process electronic data. The storage device may include any suitable memory or mass storage devices (such as solid-state drive, diskette, hard drive, compact disc read only memory (CD-ROM), and so forth). Each of the computing devices included in the computing system 100 may include one or more buses (and bus bridges, if suitable) to communicatively couple the processing device, the storage device, and any other devices included in the respective computing devices. The storage device may include a set of computational logic, that may include one or more copies of computer readable media having instructions stored therein which, when executed by the processing device of the computing device, may cause the computing device to implement any of the techniques and methods disclosed herein, or any portion thereof. The mobile computing device 102, the stationary personal computing device 104, and the remote computing device 106 may each include peripheral devices, which may communicate via wired or wireless communication pathways, such as cameras, printers, scanners, radio frequency identification (RFID), readers, credit card swipe devices, or any other peripheral devices. Except for the inter-computing device negotiation teachings of the present disclosure incorporated therein, the mobile computing device 102, the stationary personal computing device 104, and the remote computing device 106 may be a broad range of such devices known in the art. Specific, but not limiting, examples are described below. In some embodiments, the computational logic may include any of the logic discussed below with reference to FIG. 2.

The mobile computing device 102 may be a computing device that is configured for carrying along with a user. In some embodiments, the mobile computing device 102 may be a wearable computing device, and may be integrated into a garment, accessory, or other support structure that is configured to be worn on the body of the user (or "wearer"). Examples of suitable support structures for the mobile computing device 102 may include glasses, a headset, a hair accessory (e.g., a headband or barrette), an ear piece, jewelry (e.g., brooch, earrings, or a necklace), a wrist band (e.g., a wristwatch), a neck band (e.g., a tie or scarf), a garment (e.g., a shirt, pants, dress skirt, or jacket), a hat, shoes, a lanyard or name tag, a contact lens, or an implantable support structure, among others. In some embodiments, the mobile computing device 102 may include one or more devices for generating data about the location of the mobile computing device 102 and/or its proximity to other computing devices (such as the stationary personal computing device 104). Examples of such devices may include a GPS device, a Wi-Fi-based location device, a cellular network-based location device, an image capture device for capturing images of the environment of the mobile computing device 102, an NFC device, or any other such device. The mobile computing device 102 may also include a communications device for wired and/or wireless transmission of the location data to other computing devices (e.g., the stationary personal computing device 104 or the remote computing device 106).

In some embodiments, the mobile computing device 102 may be a computing device configured for carrying in a pocket, backpack, or other carrying case. Examples of mobile computing devices that may serve as the mobile computing device 102 include cellular phones, smartphones, other personal mobile communication devices, tablets, electronic book readers, personal digital assistants, laptops, or other such computing devices. Negotiation operations performed by the mobile computing device 102 may be controlled by an app or plug-in on the mobile computing device 102, for example. Although the mobile computing device 102 may be referred to in the singular, the mobile computing device 102 may include two or more distinct devices associated with the user. For example, the mobile computing device 102 may include a wrist-mounted computing device in communication with a smartphone. Processing operations performed by the mobile computing device 102 in this example may be distributed between the wrist-mounted computing device and the smartphone.

In some embodiments, the stationary personal computing device 104 may be a computing device configured to rest semi-permanently on a surface (e.g., as a server does in a rack, as a desktop computer does on a desk, or as a tablet does when mounted in a stand or holder). Examples of personal computing devices that may serve as the stationary personal computing device 104 include desktop computing devices, point-of-sale terminals, and large shared computing kiosks. As used herein, a "point-of-sale terminal" may be a personal computing device located in a retail or other commercial establishment that is used by personnel to conduct transactions with customers. In some embodiments, a point-of-sale terminal may be a traditional cash register, having a compartment for storing currency and/or relatively large buttons for receiving user inputs. A point-of-sale terminal may be communicatively coupled with a remote computing device (e.g., the remote computing device 106), which may manage inventory or other operations of the commercial establishment. For example, a point-of-sale terminal at an airline ticket counter may be configured to read passport information and check travel eligibility. In some embodiments, a point-of-sale terminal may be coupled with the remote computing device via a wired communication connection. In some embodiments, a point-of-sale terminal may include a tablet or other computing device coupled with hardware for performing transactions (e.g., a credit card magnet strip or chip scanner).

Negotiation operations performed by the stationary personal computing device 104 may be controlled by an application or plug-in on the stationary personal computing device 104, for example. In some embodiments, the stationary personal computing device 104 or the remote computing device 106 may have more computing resources (e.g., processing power, memory, and/or communication bandwidth) than the mobile computing device 102. Thus, in some embodiments, data captured and preliminarily processed by the mobile computing device 102 may be transmitted over the communication pathway 108 to the personal computing device 104, or over the communication pathway 112 to the remote computing device 106, for further processing.

The remote computing device 106 may include one or more servers (e.g., arranged in a "cloud" computing configuration) or other computing devices remote from the mobile computing device 102 and the stationary personal computing device 104. The communication pathway 112 between the mobile computing device 102 and the remote computing device 106, and the communication pathway 110 between the stationary personal computing device 104 and the remote computing device 106, may be configured according to any remote wired or wireless communication protocol. In some embodiments, the remote computing device 106 may have more computing resources (e.g., processing power, memory, and/or communication bandwidth) than the mobile computing device 102 or the stationary personal computing device 104. Thus, in some embodiments, data captured and preliminarily processed by the mobile computing device 102 and/or the stationary personal computing device 104 may be transmitted over the communication pathways 110 and/or 112 to the remote computing device 106 for further processing.

In some embodiments, the remote computing device 106 may communicate with a plurality of stationary personal computing devices (configured similarly to the stationary personal computing device 104) and/or a plurality of mobile computing devices (configured similarly to the mobile computing device 102). The remote computing device 106 may perform similar processing and storage operations for each mobile or stationary personal computing device. For example, the remote computing device 106 may receive location data provided by a plurality of mobile or stationary personal computing devices (configured similarly to the mobile computing device 102 or stationary personal computing device 104) and may perform negotiation operations based on the location data (e.g., indicating to the stationary personal computing device 104 or the mobile computing device 102 that other computing devices are within a predetermined proximity). The remote computing device 106 may devote different resources to different ones of the plurality of stationary personal or mobile computing devices in communication with the remote computing device (e.g., different memory partitions or databases for each device).

In some embodiments of the inter-computing device negotiation systems disclosed herein, one or more of the components of the computing system 100 shown in FIG. 1 may not be included. For example, in some embodiments, the computing system 100 may not include a remote computing device 106. In some embodiments, the computing system 100 may not include a stationary personal computing device 104, and all inter-computing device negotiation operations may be distributed between the mobile computing device 102 and the remote computing device 106. In some embodiments, one or more of the communication pathways between components of the computing system 100 may not be included; for example, in some embodiments, the mobile computing device 102 may not communicate directly with the remote computing device 106 via the communication pathway 112 (but may communicate with the remote computing device 106 via the stationary personal computing device 104 and the communication pathways 108 and 110).

FIG. 2 depicts an illustrative computing device 200 configured for inter-computing device negotiation, in accordance with various embodiments. As discussed above with reference to the computing system 100, the computing device 200 may be configured to perform any of a number of proximity-based inter-computing device negotiation operations. For example, the computing device 200 may be configured to determine that a second computing devices is within a predetermined proximity of the computing device 200, cause the transmission of negotiation initiation data to the second computing device, in response to the determination, receive negotiation response data provided by the second computing device, determine that the negotiation response data meets negotiation evaluation criteria, and cause the transmission of a confirmation message to the second computing device in response to the determination that the negotiation response data meets the negotiation evaluation criteria. The computing device 200 may be implemented by one or more computing devices of the computing system 100 of FIG. 1, in accordance with various embodiments. For example, the computing device 200 may be the mobile computing device 102 or the stationary personal computing device 104. The second computing device may be the mobile computing device 102 or the stationary personal computing device 104. The components of the computing device 200 may be distributed in any suitable manner among one or more of the components of the computing system 100. Although a number of components are illustrated in FIG. 2, various embodiments may omit components as appropriate for the inter-computing device negotiation operations to be performed. For example, some embodiments of the computing device 200 may not be configured for Wi-Fi location determination (and instead may use another location determination technique, or receive a location signal from an external device), and thus may not include the Wi-Fi device 228.

The computing device 200 may include input/output (I/O) devices 230. The I/O devices 230 may include a receiver 226, a transmitter 228, a display 232, a location device 234, and other I/O devices 240. Although the I/O devices 230 (and other components described herein) may be referred to in the plural, any number of I/O devices may be included in the I/O devices 230 (and similarly, any component may include multiple such components).

The receiver 226 and the transmitter 228 may include any suitable hardware to enable wireless and/or wired communication between various components instantiating the computing device 200 and with devices external to the computing device 200.

In some embodiments, the receiver 226 may be configured to receive wired and/or wireless signals from one or more other computing devices. The receiver 226 may include suitable hardware for supporting wired and/or wireless communications, such as antennas, network interface cards, modems, Wi-Fi devices, Bluetooth devices, NFC devices, and so forth, in accordance with known techniques. In particular, the receiver 226 may be configured to support data received via one or more predetermined communication protocols. For example, in some embodiments, the receiver 226 may be a Bluetooth receiver, and may be configured to receive signals transmitted in accordance with the Bluetooth protocol. In some embodiments, the types of protocols supported by the receiver 226 may be stored in the storage device 236. The receiver 226 may provide the signals received to the negotiation operations logic 202 via the I/O device interface 238. In some embodiments, the receiver 226 may perform one or more processing operations on signals received before providing the signals to the I/O device interface 238. For example, if the receiver 226 receives a wireless signal encoded in accordance with a particular communication protocol (e.g., NFC), the receiver 226 may decode the signal prior to providing it to the negotiation operations logic 202.

In some embodiments, the transmitter 228 may be configured to transmit wired and/or wireless signals from one or more other computing devices. As discussed above with reference to the receiver 226, transmitter 228 may include suitable hardware for supporting wired and/or wireless communications, such as antennas, network interface cards, modems, Wi-Fi devices, Bluetooth devices, NFC devices, and so forth, in accordance with known techniques. In particular, the transmitter 228 may be configured to transmit data via one or more predetermined communication protocols. For example, in some embodiments, the transmitter 228 may be a Wi-Fi transmitter, and may be configured to transmit signals in accordance with the Wi-Fi protocol. In some embodiments, the types of protocols supported by the transmitter 228 may be stored in the storage device 236. The transmitter 228 may receive data to be transmitted from the negotiation operations logic 202 via the I/O device interface 238. In some embodiments, the transmitter 228 may perform one or more processing operations on data received from the negotiation operations logic 202 before transmitting the signals to other computing devices. For example, if the transmitter 228 receives data from the negotiation operations logic 202 that is to be transmitted in accordance with a particular communication protocol (e.g., cellular), the transmitter 228 may encode the data in accordance with the communication protocol prior to transmitting it.

Although the receiver 226 and the transmitter 228 are illustrated separately in FIG. 2, the receiver 226 of the transmitter 228 may be integrated into a single hardware device. For example, the receiver 226 of the transmitter 228 may be packaged together on a circuit board to enable communication in accordance with a particular communication protocol. In some embodiments, the location device 234 may provide data indicative of the location of the computing device 200 and/or the proximity of the computing device 200 to one or more other computing devices. Any of a number of different types of devices may be included in the location device 234. For example, in some embodiments, the location device 234 may include an image capture device. For example, images captured by an image capture device of the environment of the computing device 200 may be transmitted to the proximity logic 204 (discussed below), and the proximity logic 204 may compare the captured images to images stored in the storage device 236 to identify recognized landmarks, in accordance with known techniques. When landmarks in the environment are identified in the captured images, the proximity logic 204 may determine an approximate location of the computing device 200. In some embodiments, images including Quick Response (QR) codes or other visual indicators in the environment of the computing device 200 may be recognized by the proximity logic 204 to determine an approximate location of the computing device 200. In some embodiments, an image capture device of the computing device 200 may capture an image of another computing device and thereby determine that the two computing devices are in proximity. In some embodiments, an image capture device may include a depth camera (which may also be referred to as a "three-dimensional camera"), which may produce images that include depth data per pixel, representative of the distance between an object in an imaged scene corresponding to the pixel and the image capture device.

In some embodiments, the location device 234 may include a GPS device. A GPS device may be configured to receive messages from satellites that allow the GPS device to generate location data for the computing device 200, in accordance with known techniques. The location data may include latitude, longitude, and altitude, for example.

In some embodiments, the location device 234 may include a Wi-Fi device. A Wi-Fi device may be configured to generate location data for the computing device 200 based on the received signal strengths from identified Wi-Fi beacons (e.g., identified via Service Set Identifiers and/or Media Access Control data) having known positions (e.g., stored in the storage device 236 or another accessible storage device), in accordance with known techniques.

In some embodiments, the location device 234 may include a cellular location device. A cellular location device may be configured to generate location data based on multilateration of cellular communication network signals from different radio towers detected at the computing device 200, in accordance with known techniques.

Any other device for location data generation may be included in the location device 234, including an accelerometer (whose signal may be integrated once to generate velocity data and twice to generate location data), an altimeter, an Internet Protocol (IP) address detection device, or any other suitable device.

Although the location device 234 is illustrated separately from the receiver 226 and the transmitter 228, the functionality of the location device 234 may be performed by the receiver 226 and/or the transmitter 228. For example, short-range wireless communication protocols, such as Bluetooth and NFC, may enable device "discovery," whereby the computing device 200 may be able to detect other computing devices within a predetermined proximity of the computing device 200 because the other computing devices may broadcast their presence in accordance with the communication protocol. Thus, in some embodiments, no separate location device 234 may be included in the computing device 200. Instead, the computing device 200 may use data representative of the ability of another computing device to communicate with the computing device 200 (via the receiver 226 and/or the transmitter 228) to determine that the another computing device is within a predetermined proximity of the computing device 200.

The display 232 may include one or more heads-up displays (i.e., displays including a projector arranged in an optical collimator configuration and a combiner to provide data without requiring a user to look away from his or her typical viewpoint), computer monitors, projectors, touchscreen displays, liquid crystal displays (LCDs), light-emitting diode displays, or flat panel displays, for example. In some embodiments, the computing device 200 may be configured to provide a user interface via the display 232. The user interface may enable a user of the computing device 200 to input and/or view negotiation initiation data, input and/or view negotiation response data, view confirmation or rejection messages, or perform a number of other functions related to the negotiation operations discussed herein. For example, in some embodiments in which the computing device 200 receives negotiation initiation data, the computing device 200 may provide a visual display of at least some of the negotiation initiation data via the display 232. A number of examples of user interfaces that may be provided by the computing device 200 via the display 232 are discussed below.

The other I/O devices 240 may also include any desired input and/or output devices that may enable the negotiation functionality disclosed herein, or may otherwise be desired in a computing device. Examples of other I/O devices 240 may include a keyboard, a cursor control device such as a mouse, a stylus, a touchpad, a bar code reader, a QR code reader, an RFID reader, an audio capture device (which may include one or more microphones arranged in various configurations), an image capture device (e.g., any of the image capture devices discussed above), gesture capture and recognition hardware (e.g., to track the movement of a user's hands and/or eyes), an audio output device (e.g., one or more speakers or other audio transducers that may be, for example, mounted in one or more earphones or earbuds), printers, projectors, additional storage devices, or any other suitable I/O device.

The computing device 200 may include negotiation operations logic 202. As discussed above, the negotiation operations logic 202 may include an I/O device interface 238 configured to receive data from the I/O devices 230, and logic components configured to process information provided by the I/O devices 230 and output the results of the processing to the I/O devices 230 and/or the storage device 236. Although the components of the negotiation operations logic 202 are illustrated separately, the components may be combined or divided as suitable, and each may use one or more of the results generated by others in performing its own processing, as discussed below. Data may be communicated between the components of the negotiation operations logic 202 over a physical bus, a long-distance wired communication pathway, a short- or long-distance wireless communication pathway, or any combination of communication pathways. The computing device 200 may include a storage device 236. In some embodiments, the storage device 236 may include one or more databases or other data storage structures, which may include memory structures for storing any of the data described herein used for inter-computing device negotiation operations. Examples of data structures that may be included in the storage device 236 are discussed below. The storage device 236 may include any volatile or nonvolatile memory device, such as one or more hard drives, solid state logic, or portable storage media, for example.

The following paragraphs include discussions of the exchange of negotiation data between the computing device 200 and other computing devices (e.g., a second computing device). In various embodiments, the computing device 200 and the other computing devices may be any suitable combination of computing devices. For example, in some embodiments, the computing device 200 may be a mobile computing device (e.g., a mobile computing device 102). In some such embodiments, the second computing device may be a fixed point-of-sale terminal (e.g., a stationary personal computing device 104). In some embodiments, the computing device 200 may be a non-mobile point-of-sale terminal (e.g., stationary personal computing device 104), which may be wired to a communication network. In some embodiments, the computing device 200 may be a mobile computing device (e.g., a mobile computing device 102) and the second computing device may be another mobile computing device (e.g., a mobile computing device 102). These combinations are simply illustrative, and any suitable combination of devices may exchange negotiation data in accordance with the techniques presented herein.

The negotiation operations logic 202 may include proximity logic 204. The proximity logic 204 may be coupled with the I/O device interface 238, and may be configured to determine that a second computing device is within a predetermined proximity of the computing device 200. As discussed above with reference to the location device 234, the proximity logic 204 may receive data indicative of the location and/or proximity of other computing devices that may determine whether these other computing devices are within the predetermined proximity. In some embodiments, the predetermined proximity may be a proximity imposed by limitations of one or more short-range wireless communications protocols. For example, if the computing device 200 is configured to communicate with other computing devices via a Bluetooth protocol, a second computing device may be within the predetermined proximity if the computing device 200 is able to successfully communicate with the second computing device via the Bluetooth protocol.

In some embodiments, the predetermined proximity may be characterized by a particular predetermined radius around the computing device 200; if a second computing device is within the radius, it is within the predetermined proximity. In such embodiments, the computing device 200 may receive data indicative of the location of the second computing device from the location device 234 (e.g., coordinates of the second computing device provided by a GPS device) and may determine whether the second computing device is within the predetermined proximity.

In some embodiments, a second computing device may be within a predetermined proximity of the computing device 200 if both the second computing device and the computing device 200 are within a particular geofence boundary. For example, if the computing device 200 and the second computing device are both within the boundaries of a "shopping mall," "airport," or "school" geofence area, the second computing device may be within the predetermined proximity of the computing device 200. In some embodiments, the definition of the predetermined proximity may be stored in the storage device 236, and may be accessed by the proximity logic 204 when determining whether a second computing device is within a predetermined proximity of the computing device 200. In some embodiments, the definition of the predetermined proximity may be changed by a user (e.g., using a user interface via the display 232). For example, if a user is at a farmer's market and wishes to begin a negotiation around the purchase of apples, the user may select a "farmer's market" geofence and may determine whether there are other computing devices present within the "farmer's market" geofence. The user may define the "farmer's market" geofence by selecting points on a map to serve as the boundaries of the geofence, or may select the "farmer's market" geofence from a database of geofences (e.g., provided by the remote computing device 106 and/or stored in the storage device 236).

Regardless of how the predetermined proximity is defined, the proximity logic 204 may be configured to receive data indicative of the location and/or proximity of a second computing device from the location device 234, retrieve stored proximity criteria from the storage device 236, and compare the received data to the stored proximity criteria to determine whether or not the second computing device is within the predetermined proximity. The form of the proximity criteria stored in the storage device 236 may vary depending upon the characterization of the predetermined proximity. For example, in some embodiments, the proximity criteria may be a sufficient signal strength to enable short-range wireless communication in accordance with one or more communication protocols. In some embodiments, the proximity criteria may be a radius within which the second computing device must be present with reference to the computing device 200. In some embodiments, the proximity criteria may be boundaries of a selected geofence.

The proximity logic 204 may be configured to evaluate other characteristics of the second computing device in determining whether the second computing device is suitable for commencing a negotiation. For example, in some embodiments, the determination that a second computing device is within a predetermined proximity of the computing device 200 may be based at least in part on a determination that the second computing device is enabled with a predetermined wireless communication capability. For example, if the computing device 200 is configured to conduct the exchange of negotiation data over a Bluetooth communication pathway, the proximity criteria may require that the second computing device be enabled with Bluetooth capability. Other predetermined wireless communication capabilities that may be used by the proximity logic 204 to determine whether a second computing device is within a predetermined proximity of the computing device 200 include Wi-Fi communication capability, and Near Field Communication (NFC) capability. Any other desired communication capability may be included in the proximity criteria.

In some embodiments, the determination that a second computing device is within a predetermined proximity of the computing device 200 may be based at least in part on a determination that the second computing device is enabled with a predetermined security capability. This kind of proximity criteria may ensure that the second computing device is able to exchange data securely with the computing device 200, in accordance with a predetermined security standard specified by the computing device 200. Examples of predetermined security capabilities that may be required by the proximity logic 204 of the computing device 200 may include Software Guard Extensions (SGX), Converge Security and Manageability Engine (CSME), and secure enclaves (SE) capability. Any other desired security capability may be included in the proximity criteria.

In some embodiments, the determination that a second computing device is within a predetermined proximity of the computing device 200 may be based at least in part on a stored characteristic of a user associated with the computing device 200. For example, in some embodiments, the user of the second computing device must have a particular characteristic that is stored in a memory and accessible to the proximity logic 204 in order for the proximity logic 204 to determine that the second computing device is within the predetermined proximity. For example, if the user of the computing device 200 wishes to purchase a seat on a flight that is full, only computing devices associated with users who have tickets for that flight may be considered. In another example, if users of various computing devices within a negotiation system each have an associated rating (indicating, e.g., the number of successful negotiations in which he or she has participated), a second computing device may only be considered to be within a predetermined proximity of the computing device 200 if the user of the second computing device has a rating above a settable threshold.

The proximity logic 204 may perform the operations described above for multiple other computing devices (e.g., substantially simultaneously or in series), thereby determining that one or more other computing devices are within a predetermined proximity of the computing device 200.

The negotiation operations logic 202 may include negotiation initiation logic 206. The negotiation initiation logic 206 may be coupled with the I/O device interface 238 and may be configured to cause transmission of negotiation initiation data to the second computing device. In some embodiments, the negotiation initiation logic 206 may cause transmission of negotiation initiation data to the second computing device by providing the negotiation initiation data to the transmitter 228 via the I/O device interface 238, whereupon the transmitter 228 may transmit the negotiation initiation data to the second computing device.

As used herein, "negotiation initiation data" may include any data suitable for notifying a receiving computing device that another computing device (e.g., the transmitting computing device or another computing device) wishes to initiate a negotiation with the receiving computing device. In some embodiments, the negotiation initiation data may include a description of a product or service over which a negotiation is to take place. For example, in some embodiments, to initiate a sale of a particular product or service, the negotiation initiation data may include a description of the product or service. A description of a product or service may include a text description, a still image or video description, a sample, or any other suitable description of the product or service. A description of a product or service may include a link to a website or other remote resource that includes additional information about the product or service.

In some embodiments, the negotiation initiation data may include information about the terms of the negotiation. For example, to initiate a sale of a particular product or service, the negotiation initiation data may include a minimum price for the product or service. In some embodiments, the negotiation initiation data may include a date or date range over which the product or service may be provided. The negotiation initiation data may include any other restrictions on the negotiation around the product or service.

The negotiation initiation data may include a specification of what information is necessary in order for the second computing device to provide a proper response if a user of the second computing device wishes to participate in the negotiation. For example, if the negotiation initiation data indicates that a user of the computing device 200 wishes to purchase a product or service, the negotiation initiation data may also specify that a proper response must include a price of the product or service, a delivery date of the product or service, and contact information for the user of the second computing device. The types of information required for a proper response may be specified by the user of the computing device 200, or may be default settings that accompany a negotiation of a particular type.

In some embodiments, at least some of the negotiation initiation data may be received at the negotiation initiation logic 206 for transmission to the second computing device from a user of the computing device 200 via an input device of the computing device 200 (e.g., such as a keypad or touchscreen included in the I/O devices 230). In some embodiments, at least some of the negotiation initiation data is to be received at the negotiation initiation logic 206 for transmission to the second computing device from a computer inventory specifying products or services available for negotiation. For example, when the computing device 200 is a point-of-sale terminal, at least some of the negotiation initiation data may be based on inventory information received from a remote inventory computing device (e.g., the remote computing device 106). The pathway over which the inventory information may be transmitted may be wired or wireless. In conventional retail establishments, the computing device 200 may be connected via a wired communication pathway to remote inventory information.

In some embodiments, the negotiation initiation data may not originate at the computing device 200 (which transmits the negotiation initiation data to the second computing device to initiate a negotiation), but may instead originate at a third computing device different from the computing device 200 and the second computing device, and may be received at the computing device 200 via the receiver 226 and the I/O device interface 238. The third computing device may be a mobile computing device 102, a stationary personal computing device 104, or a remote computing device 106. In some such embodiments, the computing device 200 may act as a "conduit" or "manager" of the negotiation, even though the initial interest in negotiation may not have arisen from a user of the computing device 200. The third computing device may transmit the negotiation initiation data to the computing device 200 along with an indicator that the computing device 200 is to serve as such a "manager" of the negotiation, and report the results (e.g., the determination made by the negotiation evaluation logic 210, discussed below) to the third computing device. The negotiation initiation logic 206 of the computing device 200 may receive the negotiation initiation data and the indicator, and may accept or deny the "management" role in accordance with selection criteria. In one example, when the selection criteria is predefined criteria (e.g., the processing resources currently available at the computing device 200), the negotiation initiation logic 206 of the computing device 200 may automatically accept or deny the "management" role in accordance with the predefined criteria (e.g., the processing resources currently available at the computing device 200). In another example, when the selection criteria is based on user input, the negotiation initiation logic 206 of the computing device 200 may prompt the user of the computing device 200 to accept or deny the "management" role, and may accept or deny the "management" role in accordance with the user input.

The third computing device may "select" the computing device 200 to act as the "manager" in any of a number of ways. For example, the third computing device may include negotiation initiation logic 206, coupled with the proximity logic 204, configured to determine that the computing device 200 has more residual energy than the third computing device. The negotiation initiation logic 206 may make this determination based upon a report of the residual energy (e.g., battery life percentage) of the computing device 200 provided by the computing device 200. In some embodiments, the third computing device may include negotiation initiation logic configured to determine that the computing device 200 has a more powerful antenna than the third computing device, and thus may be able to reach more other computing devices than the third computing device could. Antenna strength information may also be provided by the computing device 200 (e.g., and broadcast to any other computing device configured with suitable negotiation operations logic 202). In various embodiments, the computing device 200 may broadcast any information that may be helpful to another computing device for determining whether the computing device 200 is suitable for "managing" a negotiation, and this information may be used to select the computing device 200 for such a "management" role. A user may not need to perform any activity to cause this broadcasting once the user has indicated an initial interest in participating in negotiations, thus minimizing work on the part of the user.

In some embodiments, the third computing device may not itself select the computing device 200 to act as the "manager," but may instead query a remote computing device (e.g., the remote computing device 106) to select the computing device 200. In general, various operations performed by the computing device 200 and other computing devices disclosed herein may be "offloaded" to a remote computing device (such as the remote computing device 106) when suitable. For example, in various embodiments, the remote computing device 106 may perform manager selection, secure remote attestation, bidding coordination, and ad hoc group formation.

The negotiation initiation logic 206 may perform the operations described above for multiple other computing devices (e.g., substantially simultaneously or in series), thereby causing the transmission of negotiation initiation data to one or more other computing devices.

The negotiation operations logic 202 may include negotiation response logic 208. The negotiation response logic 208 may be coupled to the receiver 226 via the I/O device interface 238, and may be configured to receive negotiation initiation data (e.g., from negotiation initiation logic 206 of another computing device) and to process the negotiation initiation data so as to provide a visual or other indicator of at least some of the negotiation initiation data to a user. For example, in response to receiving negotiation initiation data that includes an image of a product and a text description of a product, the negotiation response logic 208 may parse the negotiation initiation data and cause the display of the image and the text description on the display 232. In some embodiments, the negotiation response logic 208 may be configured to cause an audio or tactile indication of at least some of the negotiation initiation data. For example, the negotiation response logic 208 may cause at least some of the text description to be "read out loud" by computer-generated voice logic. In some embodiments, the negotiation response logic 208 may be configured to provide confirmation to the transmitting computing device that the negotiation initiation data has been received (e.g., via the I/O device interface 238 and the transmitter 228).

The negotiation operations logic 202 may include negotiation evaluation logic 210. The negotiation operations logic 210 may be coupled with the negotiation response logic 208 and may be configured to determine that negotiation response data, provided by the second computing device in response to receipt of the negotiation initiation data, meets negotiation evaluation criteria. In some embodiments, the negotiation response data may be received at the negotiation evaluation logic 210 via the receiver 226 and the I/O device interface 238.

Negotiation evaluation criteria may be stored in the storage device 236, and may be accessed by the negotiation evaluation logic 210 in response to receiving negotiation response data from a second computing device. The negotiation evaluation criteria may include static and/or dynamic negotiation evaluation criteria. For example, static negotiation criteria may include one or more requirements for negotiation response data to be a proper response. As discussed above, a proper response will include information to address each of the required types of information specified by the negotiation initiation data. For example, if the computing device 200 transmits negotiation initiation data indicating a desire to sell a particular item for at least $10, negotiation response data that indicates that a user of the second computing device is willing to purchase the item for $5 may violate the negotiation evaluation criteria and thus may be an improper response. In some embodiments, the negotiation response logic 208 of the second computing device may prohibit a user of the second computing device from sending negotiation response data that violates specifications in the negotiation initiation data from the computing device 200.

Dynamic negotiation evaluation criteria may include negotiation criteria that change as negotiation response data is received. For example, if a user of the computing device 200 wishes to sell a product to the highest bidder, but for no less than $10, the negotiation evaluation criteria may initially specify a required price of at least $10. If the second computing device then transmits negotiation response data that indicates a willingness to pay $15, the negotiation evaluation criteria may then change to specify that any further negotiation responses must indicate a willingness to pay at least $15 to satisfy the negotiation evaluation criteria. In such an embodiment, the negotiation response data provided by the second computing device acts as a threshold offer value, and in response, the negotiation evaluation criteria includes exceeding the threshold offer value.

Negotiation evaluation criteria may include any desired criteria related to the willingness of the user of the computing device 200 to enter into a transaction with a second computing device. For example, the negotiation evaluation criteria may include different weights associated with different negotiation response data elements, and may weigh each of these negotiation response data elements in accordance with the weights. For example, if the negotiation initiation data indicates that a user of the computing device 200 wishes to sell a house, the negotiation initiation data may request that a responding computing device specify both an offer price for the house and a debt/income ratio for the user of the responding computing device. The negotiation evaluation logic 210 may use negotiation evaluation criteria that specify that 90 percent of the evaluation of the negotiation response data be based on the offer price, and 10 percent be based on how far below a particular threshold the debt/income ratio falls. In this manner, the negotiation evaluation criteria may enable the negotiation evaluation logic 210 to evaluate multiple elements of the negotiation response data.

The negotiation evaluation logic 210 may be configured to receive negotiation response data from a plurality of other computing devices, and evaluate the negotiation response data from each of the plurality of other computing devices against the negotiation evaluation criteria. In some embodiments, the negotiation evaluation criteria may specify that only a single other computing device may satisfy the negotiation evaluation criteria (e.g., when the "highest bidder" is sought). In other embodiments, the negotiation evaluation criteria may allow for two or more other computing devices to satisfy the negotiation evaluation criteria (e.g., when multiple copies of a single item are for sale).

The negotiation evaluation logic 210 may also be configured to cause the transmission of a confirmation message to the second computing device after a determination that the negotiation response data from the second computing device meets the negotiation evaluation criteria. In some embodiments, the negotiation evaluation logic 210 may cause transmission of the confirmation message to the second computing device by providing confirmation message data to the transmitter 228 via the I/O device interface 238, whereupon the transmitter 228 may transmit the confirmation message to the second computing device.

The confirmation message may specify next steps for a user of the second computing device to follow to complete the negotiation, or may cause the second computing device to automatically initiate completion of a transaction (e.g., by transferring a payment or sending contact information for the second computing device). In some embodiments, the negotiation evaluation logic 210 may be configured to cause the transmission of a denial message to the second computing device after determination that the negotiation response data from the second computing device does not meet the negotiation evaluation criteria. In some embodiments, the negotiation evaluation logic 210 may cause transmission of the denial message to the second computing device by providing denial message data to the transmitter 228 via the I/O device interface 238, whereupon the transmitter 228 may transmit the denial message to the second computing device.

In some embodiments, the negotiation evaluation logic 210 may be configured to terminate or restart bidding if the negotiation evaluation criteria are not satisfied within a predetermined amount of time, or circumstances change such that the negotiation is no longer appropriate (e.g., if inventory changes so as to make the negotiated-over product unavailable).

In some embodiments, the storage device 236 may store historical negotiation information that may be used for future marketing, targeted product offers, or other future negotiations. In some embodiments, the storage device 236 may include a cloud-based portion that stores such information and is configured to provide us to devices engaged in negotiation (e.g., vendors or customers).

FIGS. 3 and 4 illustrate two example negotiation communication topologies between different computing devices, in accordance with various embodiments. For example, in the topology 300 of FIG. 3, a computing device 302 may determine that the computing devices 304, 308, and 310, are within a predetermined proximity of the computing device 302. The computing device 302 may attempt to initiate a negotiation with the computing devices 304, 308, and 310, by transmitting negotiation initiation data to these computing devices. The computing device 306 may broadcast information to the computing device 302, indicating its availability for negotiation, but the computing device 302 may determine that the computing device 306 does not satisfy the proximity criteria (e.g. due to the location, communication capability, and/or security capability of the computing device 306). The computing devices 304 and 310 may respond to the negotiation initiation data with negotiation response data. The computing device 308, however may decline the opportunity to be involved in the negotiation, and may not transmit negotiation response data (except for a decline message, in some embodiments).

In the topology 400 of FIG. 4, a computing device 402 may determine a computing device 404 is within a predetermined proximity of the computing device 402, and may transmit, to the computing device 404, negotiation initiation data and an indicator that the computing device 404 is desired to act as a "manager" of a negotiation. The computing device 404 may signal its acceptance of the "manager" role to the computing device 402, and may determine that the computing devices 406, 408, and 410 are within a predetermined proximity of the computing device 404, and may transmit negotiation initiation data to these computing devices. The computing device 410 may respond to the negotiation initiation data with negotiation response data. The computing devices 406 and 408, however, may decline the opportunity to be involved in the negotiation, and may not transmit negotiation response data (except for decline messages, in some embodiments). The computing device 404 may evaluate the negotiation response data on behalf of the computing device 402, or may simply pass the negotiation response data to the computing device 402 for evaluation at the computing device 402.

FIG. 5 illustrates an example data structure 500 that may be used to store negotiation data received and generated by various components of the negotiation operations logic 202, in accordance with various embodiments. The data structure 500 may include a plurality of computing device entries 546, each corresponding to each of the one or more computing devices evaluated by the negotiation operations logic 202 during any of the operations discussed above. In FIG. 5, entries 546 for three computing devices ("Mobile123," "Store45POS," and "Dave's Glasses") are shown. For each of the computing device entries 546, the data structure 500 may include a number of fields, each storing data that may be used by the negotiation operations logic 202 during its operations. For example, the data structure 500 may include the following example fields:

a device ID field 502, to store an identifier of a computing device evaluated by the computing device 200 (e.g., an Internet Protocol (IP) address, a hardware identifier, or a user-supplied identifier)

an NFC field 504, to store an indicator of the NFC capability of the computing device (e.g., a binary indicator reflecting whether or not NFC is supported, and/or an NFC signal strength indicator)

a Bluetooth field 506, to store an indicator of the Bluetooth capability of the computing device (e.g., a binary indicator reflecting whether or not Bluetooth is supported, and/or a Bluetooth signal strength indicator)

a Wi-Fi field 508, to store an indicator of the Wi-Fi capability of the computing device (e.g., a binary indicator reflecting whether or not Wi-Fi is supported, and/or a Wi-Fi signal strength indicator)

an other communication capability field 510, to store any other information regarding communication capabilities of the computing device (e.g., other communication protocols supported or information about the quality of communication possible via one or more protocols)

an SGX field 512, to store an indicator of the SGX capability of the computing device (e.g., a binary indicator reflecting whether or not SGX is supported, and/or a supported version number)

a CSME field 514, to store an indicator of the CSME capability of the computing device (e.g., a binary indicator reflecting whether or not CSME is supported, and/or a supported version number)

an SE field 516, to store an indicator of the SE capability of the computing device (e.g., a binary indicator reflecting whether or not at SE is supported, and/or a supported version number)

an other security capability field 518, to store any other information regarding security capabilities of the computing device (e.g., other security protocols supported)

a field 520 indicating whether or not the computing device is configured for negotiation (e.g., a binary indicator reflecting whether or not the computing device broadcasts its ability to participate in negotiation based on, for example, installed software or hardware to support negotiation functionality)

a residual energy field 522, to store an indicator of the residual energy available at the computing device (e.g., a percentage or a voltage)

an antenna strength field 524, to store an indicator of the strength of an antenna used by the computing device for wireless communications (e.g., the magnitude of an electric field generated by the antenna)

an originator field 526, to store an indicator of whether the negotiation response data originated at the computing device (e.g., as discussed above with reference to the communication topology 400 of FIG. 4)

a manager field 528, to store an indicator of whether the computing device is managing a current negotiation (e.g., as discussed above with reference to the communication topology 400 of FIG. 4)

a negotiation initiation data field 530, to store the negotiation initiation data for a current negotiation a field 532 indicating whether or not the negotiation initiation data of the field 530 has been sent to the computing device (e.g., a binary indicator)

a field 534 indicating whether the negotiation initiation data of the field 530 was confirmed received at the computing device (e.g., a binary indicator)

a field 536 storing negotiation response data received from the computing device for a current negotiation a field 538 storing negotiation evaluation criteria to be applied to the negotiation response data of the field 536 a field 540 indicating whether or not the negotiation evaluation criteria of the field 538 has been met by the negotiation response data of the field 536 (e.g., a binary indicator).

The computing device 200 may include a data structure having one or more of the fields described above depending upon the role that the computing device 200 plays in the negotiation. For example, if the computing device 200 originates the negotiation initiation data that is not managing the negotiation (e.g., as discussed above with reference to the computing device 402 of FIG. 4), the computing device 200 may not store any of the fields related to communication capability, security capability, or response confirmations, since this information may be stored and evaluated by the managing computing device (e.g., the computing device 404 of FIG. 4). If the computing device 200 does not originate the negotiation initiation data or manage the negotiation, (e.g., if the field 526 indicates that the computing device 200 is not the originator and the field 528 indicates that the computing device is not the manager) the computing device 200 may simply be a participant in the negotiation and may only store suitable information (e.g., the field 530 storing negotiation initiation data and the field 536 storing negotiation response data).

FIGS. 6-26 depict various visual displays that may be presented on the display 232 of the computing device 200, in response to commands from the negotiation operations logic 202, during various negotiation scenarios and operations, in accordance with various embodiments. These visual displays are simply examples, and intended to illustrate various non-limiting applications of the negotiation techniques disclosed herein. The content and format of visual displays may vary depending on the platform of the computing device 200. For example, in embodiments in which the computing device 200 is a cellular phone that does not have a substantial touchscreen or other display functionality, information for visual displays may be provided by text message, and rendered purely as text. User inputs may be provided by response texts.

FIG. 6 depicts a visual display 600 that may be presented on the display 232 by the negotiation operations logic 202 prior to the commencement of the negotiation, prompting the user to indicate whether he or she wishes to participate in negotiations. In the display 600, the user is prompted to enter the categories of negotiations in which he or she may wish to participate. In some embodiments, negotiation initiation data may include indicators of one or more of these categories of negotiations so that a computing device is only prompted to participate in a category of negotiation in which interest has already been recorded. Similar displays may be presented on the display 232 to prompt the user to enter preferences for proximity criteria, such as a predetermined proximity in which other computing devices must be located to engage a negotiation, communication capabilities of the computing devices, security capabilities of the computing devices, and/or any other desired proximity criteria.

FIGS. 7-14 depict visual displays that may be presented on the display 232 in response to various operations of the negotiation operations logic 202 during a negotiation initiated by the computing device 200. FIG. 7 depicts a visual display 700 that may be presented on the display 232 by the negotiation operations logic 202 (e.g., the negotiation initiation logic 206) when the user launches a negotiations application or otherwise indicates an interest in commencing a negotiation. The display 700 prompts the user to enter a description of the item (e.g., product or service) over which he or she would like to negotiate. The negotiation initiation logic 206 may receive the description entered by the user and may store the description in the storage device 236 (e.g., as negotiation initiation data in the field 530 of the data structure 500).

FIG. 8 depicts a visual display 800 that may be presented on the display 232 by the negotiation operations logic 202 (e.g., the negotiation initiation logic 206) after the user enters a description of an item over which the user would like to negotiate (e.g., as discussed above with reference to the display 700). The display 800 prompts the user to indicate whether the user wishes to sell or purchase the described item. The negotiation initiation logic 206 may receive the indication entered by the user and may store the indication in the storage device 236 (e.g., as negotiation initiation data in the field 530 of the data structure 500). In some embodiments, the prompt illustrated in the display 800 may be presented before the prompt illustrated in the display 700.

FIG. 9 depicts a visual display 900 that may be presented on the display 232 by the negotiation operations logic 202 (e.g., the negotiation initiation logic 206) after the user enters an indication that the user wishes to sell the described item (e.g., as discussed above with reference to the displays 700 and 800). The display 900 prompts the user to enter a minimum acceptable price for the item. The negotiation initiation logic 206 may receive the minimum acceptable price information entered by the user and may store the information in the storage device 236 (e.g., as negotiation initiation data in the field 530 of the data structure 500).

FIG. 10 depicts a visual display 1000 that may be presented on the display 232 by the negotiation operations logic 202 (e.g., the proximity logic 204) after the user completes the entering of negotiation initiation data (e.g., as discussed above with reference to the displays 700, 800, and 900). The display 1000 indicates that the user should wait while the proximity logic 204 determines whether there are any computing devices within a predetermined proximity of the computing device 200 that satisfy all of the required proximity criteria (e.g., communication capability, security capability, or any other desired criteria).

FIG. 11 depicts a visual display 1100 that may be presented on the display 232 by the negotiation operations logic 202 (e.g., the proximity logic 204 and/or the negotiation response logic 208) after the proximity logic 204 determines that there is at least one other computing device that wishes to participate in the negotiation. The display 1100 indicates the number of other computing devices that are participating. In some embodiments, the visual display 1100 may not be displayed until valid response data has been received from at least one other computing device.

FIG. 12 depicts a visual display 1200 that may be presented on the display 232 by the negotiation operations logic 202 (e.g., the negotiation evaluation logic 210) after negotiation response data has been received and the negotiation response data from at least one other computing device satisfies the negotiation evaluation criteria. The display 1200 may indicate a device identifier of the computing device that provided the satisfactory negotiation response data, and may provide instructions for next steps in completing the negotiation.

If the user indicates, in response to the prompt of the display 800, that the user wishes to purchase the item described via the display 700, the visual display 1300 of FIG. 13 may be presented on the display 232 by the negotiation operations logic 202 (e.g., the negotiation initiation logic 206) instead of the display 900 of FIG. 9. The display 1300 prompts the user to enter an initial offer price for the item. The negotiation initiation logic 206 may receive the initial offer price information entered by the user and may store the information in the storage device 236 (e.g., as negotiation initiation data in the field 530 of the data structure 500).

FIG. 14 depicts a visual display 1400 that may be presented on the display 232 by the negotiation operations logic 202 (e.g., the negotiation initiation logic 206) after the user enters the initial offer price for the item (e.g., as discussed above with reference to the display 1300). The display 1400 prompts the user to enter a maximum offer price for the item. The negotiation initiation logic 206 may receive the maximum offer price information entered by the user and may store the information in the storage device 236 (e.g., as negotiation initiation data in the field 530 of the data structure 500). The negotiation operations logic may then proceed to determine whether there are any proximate devices able and interested in participating in the negotiation (e.g., via the proximity logic 204 and as described above with reference to the display 1000), and subsequent visual displays may take the form of the displays 1000, 1100, and 1200 discussed above.

FIG. 15 depicts a visual display 1500 that may be presented on the display 232 by the negotiation operations logic 202 (e.g., the negotiation initiation logic 206) upon receipt of negotiation initiation data from another computing device. The display 1500 may be provided as an overlay or alert, and may give the user of the computing device 200 an option to get more information about the potential negotiation or to ignore the potential negotiation.

FIGS. 16-18 depict visual displays that may be presented on the display 232 in response to various operations of the negotiation operations logic 202 during a negotiation initiated by a computing device different from the computing device 200. In particular, FIGS. 16-18 depict visual displays that may be presented on the display 232 in an application in which a user of the computing device 200 has a ticket on a particular airline flight, and a user of another computing device wishes to purchase that ticket.

FIG. 16 depicts a visual display 1600 that may be presented on the display 232 by the negotiation operations logic 202 (e.g., the negotiation initiation logic 206) in response to the receipt of negotiation initiation data indicating that a standby passenger on an airline flight wishes to purchase a ticket from the user of the computing device 200. The other computing device that transmits the negotiation initiation data to the computing device 200 may be a mobile computing device belonging to the standby passenger, or a point-of-sale terminal associated with the airline. The point-of-sale terminal may store device identifiers for computing devices associated with different passengers on the flight, and may transmit the negotiation initiation data to the computing devices upon a determination that the computing devices are within the airport (e.g., proximate to the gate) and satisfy any other desired proximity criteria. The display 1600 may prompt the user of the computing device 200 to enter an amount of money required for the user to sell his or her seat on the flight. The display 1600 may also include additional information regarding alternative flights, or may provide the user with the option to select a link or other menu to view this additional information. The information entered by the user in response to the display 1600 may be transmitted to the other computing device as negotiation response data and stored in a memory (e.g., in the field 536 of the data structure 500).

If the other computing device determines that the amount of money provided by the computing device 200 as negotiation response data does not satisfy negotiation evaluation criteria (e.g., is not the "lowest bid" for the seat), the other computing device may transmit a denial message to the computing device 200, and the visual display 1700 of FIG. 17 may be presented on the display 232.

If the other computing device determines that the amount of money provided by the computing device 200 as negotiation response data does satisfy negotiation evaluation criteria, the other computing device may transmit a confirmation message to the computing device 200, and the visual display 1800 of FIG. 18 may be presented on the display 232. The display 1800 may provide instructions for next steps in completing the negotiation.

In some embodiments, visual displays like those illustrated in FIGS. 16-18 may be provided when an airline has overbooked the flight or a flight has been delayed, and the airline seeks passengers who are willing to give up their seats on the flight. In such embodiments, the initiating computing device may be an airline point-of-sale terminal, rather than a computing device associated with a standby passenger. In some embodiments, when the "lowest bid" is received, additional information may be transmitted to the participating computing devices indicating the lowest bid, and asking the computing devices whether they wish to lower their bids. In some embodiments, the negotiation may take place even if computing devices belonging to passengers on the plane are not yet at the airport.

FIGS. 19-22 depict visual displays that may be presented on the display 232 in response to various operations of the negotiation operations logic 202 during a negotiation initiated by a computing device different from the computing device 200. In particular, FIGS. 19-22 depict visual displays that may be presented on the display 232 in an application in which the computing device 200 was detected or registered as a participant in a product demonstration, and a point-of-sale terminal or other computing device associated with a retail establishment offers the user of the computing device 200 the opportunity to purchase the demonstrated product. In some embodiments, a user of the computing device 200 may have previously "signed up" or otherwise registered for negotiations from the retail establishment or product demonstrator.

FIG. 19 depicts a visual display 1900 that may be presented on the display 232 by the negotiation operations logic 202 (e.g., the negotiation initiation logic 206) in response to the receipt of negotiation initiation data from another computing device indicating that the product previously demonstrated is available for negotiation. The user of the computing device 200 may be prompted to indicate whether or not he or she would like to bid on the demonstrated product. As noted above, the other computing device that transmits the negotiation initiation data to the computing device 200 may be a point-of-sale terminal or other computing device associated with a retail establishment or the entity that conducted the product demonstration. The other computing device may store device identifiers for computing devices in attendance at the product demonstration (as detected based on proximity to a computing device at the product demonstration). The negotiation initiation data may be transmitted to the computing device 200 during the product demonstration, shortly after the product demonstration, or after a substantial amount of time has passed from the product demonstration. Thus, a determination that the computing device 200 is within a predetermined proximity of the other computing device may be a determination that the computing device 200 was within a predetermined proximity of the other computing device during a particular period in time, even though the computing device 200 may no longer be within the predetermined proximity of the other computing device.

FIG. 20 depicts a visual display 2000 that may be presented on the display 232 by the negotiation operations logic 202 (e.g., the negotiation response logic 208) in response to the receipt of negotiation initiation data indicating that the product is available for negotiation. The display 2000 may prompt the user of the computing device 200 to enter an amount of money that he or she would be willing to pay to purchase the product. The display 2000 may also include additional information regarding the product, or may provide the user with the option to select a link or other menu to view this additional information. The information entered by the user in response to the display 2000 may be transmitted to the other computing device as negotiation response data and stored in a memory (e.g., in the field 536 of the data structure 500).

If the other computing device determines that the amount of money provided by the computing device 200 as negotiation response data does not satisfy negotiation evaluation criteria (e.g., is not above a minimum bid for the product), the other computing device may transmit a denial message to the computing device 200, and the visual display 2100 of FIG. 21 may be presented on the display 232.

If the other computing device determines that the amount of money provided by the computing device 200 as negotiation response data does satisfy negotiation evaluation criteria (e.g., is the "highest bid" or exceeds a minimum bid), the other computing device may transmit a confirmation message to the computing device 200, and the visual display 2200 of FIG. 22 may be presented on the display 232. The display 2200 may provide instructions for next steps in completing the negotiation.

FIGS. 23-26 depict visual displays that may be presented on the display 232 in response to various operations of the negotiation operations logic 202 during a negotiation between a computing device of a retail establishment and the computing device 200. In particular, FIGS. 23-26 depict visual displays that may be presented on the display 232 in an application in which a user of the computing device 200 wishes to make an offer on an item in a retail establishment (e.g., a store, farmers market, or other establishment).

FIG. 23 depicts a visual display 2300 that may be presented on the display 232 by the negotiation operations logic 202 (e.g., the negotiation response logic 208) when the user launches a negotiations application or otherwise indicates an interest in engaging in a negotiation with the retail establishment. Negotiation initiation data that indicates that the retail establishment has a computing device able to engage in negotiations may have been previously received by the computing device 200 (e.g., by the negotiation initiation logic 206). In this example, the negotiation initiation data may not specify a particular item over which the negotiations take place, but may simply indicate that the retail establishment computing device is willing to engage in negotiation over at least some of the inventory in the retail establishment. The display 2300 prompts the user to scan a barcode of the product over which he or she would like to negotiate. The use of a barcode in this example is simply illustrative, and any other means of entering a description may be used. The display 2300 also prompts the user to indicate the price that the user would be willing to pay for the described product. The negotiation response logic 208 may receive the information entered by the user and may store the information in the storage device 236 (e.g., as negotiation response data in the field 536 of the data structure 500). The negotiation response data may be transmitted to a point-of-sale terminal or other computing device associated with the retail establishment. In some embodiments, the user may be prompted to select an identifier of the desired retail establishment from a list of computing devices associated with different retail establishments. The list may be generated by the proximity logic 204.

If the retail establishment computing device determines that the price provided by the computing device 200 as negotiation response data does not satisfy negotiation evaluation criteria (e.g., is not above a "minimum bid" for the product), the retail establishment computing device may transmit a denial message to the computing device 200, and the visual display 2400 of FIG. 24 may be presented on the display 232. The negotiation evaluation criteria applied by the retail establishment computing device may vary depending upon the inventory of the retail establishment, expected changes in the inventory, the time of year at which the offer is received, the quotas or other performance requirements of the retail establishment, or any other suitable factors. In some embodiments, the retail establishment computing device may be a point-of-sale terminal coupled with a remote inventory management system.

If the retail establishment computing device determines that the price provided by the computing device 200 as negotiation response data does satisfy negotiation evaluation criteria (e.g., is above a "minimum bid" for the product), the retail establishment computing device may transmit a confirmation message to the computing device 200, and the visual display 2500 of FIG. 25 may be presented on the display 232. The display 2500 may provide instructions for next steps in completing the negotiation.

In some embodiments, a negotiation between computing devices may include multiple rounds of initiation and response. For example, if the price provided by the computing device 200 via the display 2300 as negotiation response data does not satisfy negotiation evaluation criteria at the retail establishment computing device, the retail establishment computing device may be configured to transmit a counter offer. The counter offer may be an offer that satisfies the negotiation evaluation criteria of the retail establishment computing device. For example, FIG. 26 depicts a visual display 2600 in which counter offer information is presented on the display 232. Counter offer information may be treated as negotiation initiation data, and may supplement or replace previously provided negotiation initiation data (e.g., in the storage device 236). As illustrated in FIG. 26, the computing device 200 may then have an opportunity to accept this counter offer, reject the counteroffer, or propose another counteroffer. The negotiation may continue until the retail establishment computing device or the computing device 200 is no longer interested in participating in the negotiation.

In some embodiments, a negotiation similar to that discussed above with reference to FIGS. 23-26 may be initiated by a retail establishment computing device when an employee of the retail establishment notices that a potential customer appeared to be interested in a product, but then lost interest in the product. The negotiation initiation data provided by the retail establishment computing device may indicate the product, and may prompt the user for his or her bid on the product.

Figure 27:
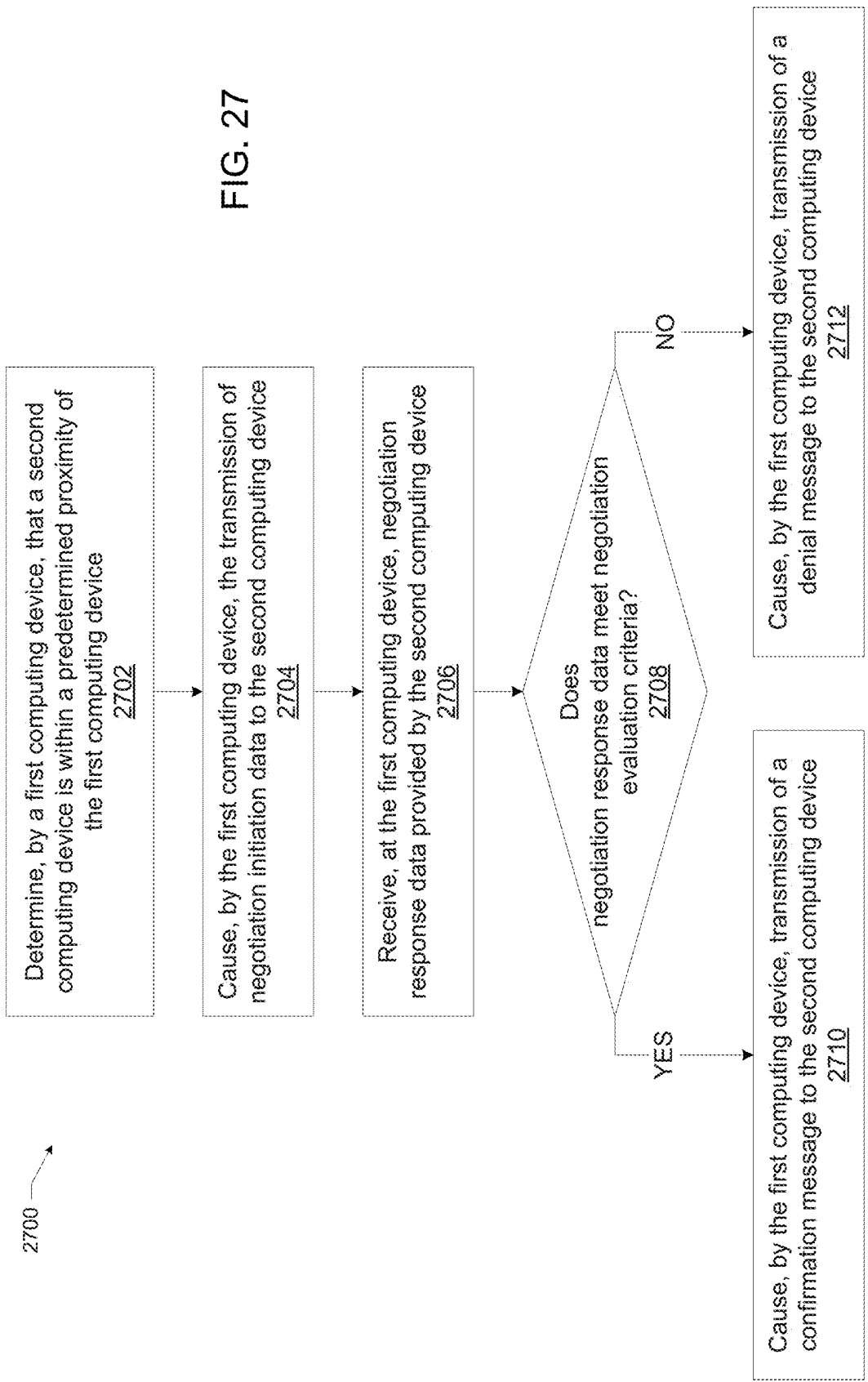
FIGS. 27-28 are flow diagrams of illustrative processes for proximity-based inter-computing device negotiation, in accordance with various embodiments.

FIG. 27 is a flow diagram of an illustrative process 2700 for proximity-based inter-computing device negotiation, in accordance with various embodiments. The operations of the process 2700 (and the other processes described herein), although illustrated as performed in a particular sequence for the sake of illustration, may be performed in parallel as suitable or in any other order. For example, operations related to receiving a negotiation response data for multiple computing devices and evaluating negotiation response data from the multiple computing devices may be performed in parallel, partially in parallel, or in any suitable order.

Operations of the process 2700 (and the other processes described herein) may be described as performed by components of the computing device 200, as embodied in the computing system 100, for illustrative purposes, but the operations of the process 2700 (and the other processes described herein) may be performed by any suitably configured computing device or collection of computing devices. Any of the operations of the process 2700 (and the other processes described herein) may be performed in accordance with any of the embodiments of the system 100 and the computing device 200 described herein.

At 2702, a first computing device may determine that a second computing device is within a predetermined proximity of the first computing device. For example, the proximity logic 204 of the computing device 200 may determine that another computing device is within a predetermined proximity of the first computing device and meets any other desired proximity criteria (e.g., communication or security criteria), as discussed above with reference to the proximity logic 204.

At 2704, the first computing device may cause the transmission of negotiation initiation data to the second computing device, in response to the determination that the second computing device is within the predetermined proximity (2702). For example, the negotiation initiation logic 206 of the computing device 200 may cause the transmission of negotiation initiation data to the other computing device, as discussed above with reference to the negotiation initiation logic 206.

At 2706, the first computing device may receive negotiation response data provided by the second computing device. For example, the negotiation response logic 208 of the computing device 200 may receive negotiation response data from the other computing device, as discussed above with reference to the negotiation response logic 208.

At 2708, the first computing device may determine whether the negotiation response data (received at 2706) meets negotiation evaluation criteria. For example, the negotiation evaluation logic 210 of the computing device 200 may determine whether negotiation response data received from the other computing device meets negotiation evaluation criteria stored in the storage device 236, as discussed above with reference to the negotiation evaluation logic 210.

If the first computing device determines at 2708 that the negotiation response data meets the negotiation evaluation criteria, the first computing device may proceed to 2710 and cause the transmission of a confirmation message to the second computing device. For example, the negotiation evaluation logic 210 may determine that the negotiation response data received from the other computing device meets negotiation evaluation criteria stored in the storage device 236 and may cause the transmission of a confirmation message to the other computing device, as discussed above with reference to the negotiation evaluation logic 210.

If the first computing device determines at 2708 that the negotiation response data does not meet the negotiation evaluation criteria, the first computing device may proceed to 2712 and cause the transmission of a denial message to the second computing device. For example, the negotiation evaluation logic 210 may determine that the negotiation response data received from the other computing device does not meet the negotiation evaluation criteria stored in the storage device 236 and may cause the transmission of a denial message to the other computing device, as discussed above with reference to the negotiation evaluation logic 210.

Figure 28:
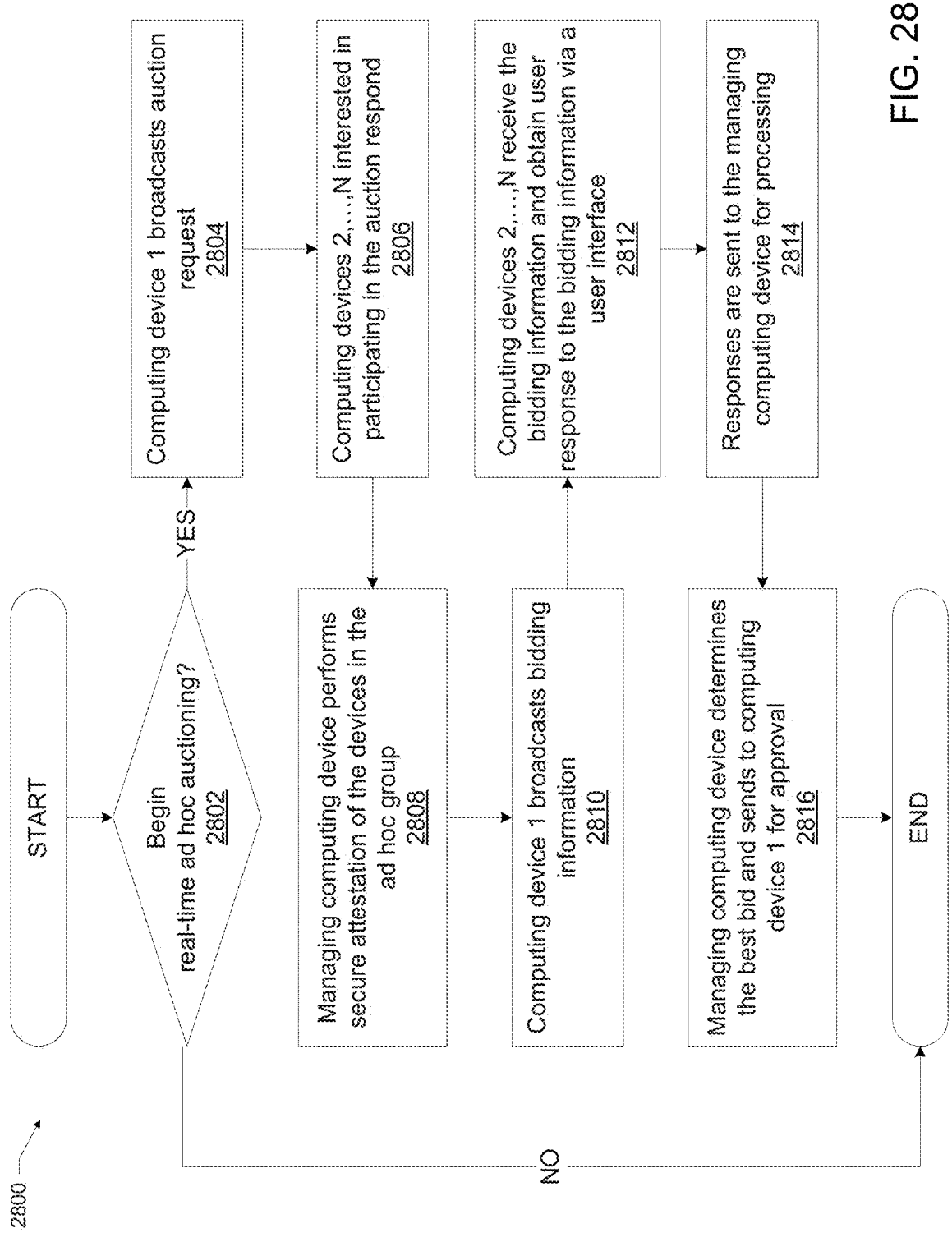

FIG. 28 is a flow diagram of an illustrative process 2800 for proximity inter-computing device negotiation to perform real-time ad hoc auctioning, in accordance with various embodiments.

At 2802, a computing device (referred to as "computing device 1") may determine whether to begin real-time ad hoc auctioning. If no, the process may end.

If yes, the process may proceed to 2804 and computing device 1 may broadcast an auction request to other computing devices. In some embodiments, computing device 1 may be the computing device 200, the auction request may include negotiation initiation data, as discussed above, and the auction request may be broadcast by the negotiation initiation logic 206 in conjunction with the I/O device interface 238 and the transmitter 228.

At 2806, other computing devices (referred to as "computing devices 2, . . . , N") that are interested in participating in the auction may respond to the auction request of 2804. In some embodiments, the responses of 2806 may include information about the location of the computing devices 2, . . . , N, communication capabilities of the computing devices 2, . . . , N, security capabilities of the computing devices 2, . . . , N, and any other suitable information helpful for determining whether to include one or more of the computing devices 2, . . . , N in an ad hoc auction group (e.g., as discussed above with reference to the proximity logic 204 of the computing device 200).

At 2808, a managing computing device may perform secure attestation of the computing devices 2, . . . , N to confirm that the computing devices 2, . . . , N meet the proximity criteria required for participation in the ad hoc group. In some embodiments, the managing computing device may be the computing device 200, and the secure attestation may be performed by the proximity logic 204. In some embodiments, the managing computing device may be the same device as computing device 1 (e.g., as discussed above with reference to FIG. 3). In some embodiments, the managing computing device may be a different device than the computing device 1 (e.g., as discussed above with reference to FIG. 4).

At 2810, computing device 1 may broadcast bidding information. In some embodiments, computing device 1 may be the computing device 200, the bidding information may be negotiation initiation data, and the bidding information may be broadcast by the negotiation initiation logic 206 in conjunction with the I/O device interface 238 and the transmitter 228.

At 2812, the computing devices 2, . . . , N may receive the bidding information and may obtain user responses to the bidding information via user interfaces of the computing devices 2, . . . , N. In some embodiments, one or more of the computing devices 2, . . . , N may be configured as discussed above with reference to the computing device 200, the user responses may be included in negotiation response data, and the negotiation response data may be received by the negotiation response logic 208.

At 2814, responses may be sent from the computing devices 2, . . . , N to the managing computing device for processing. In some embodiments, the managing computing device may be configured as discussed above with reference to the computing device 200, and processing the responses may be performed in accordance with the operations described above with reference to the negotiation evaluation logic 210 (e.g., comparison of negotiation response data included in the responses to negotiation evaluation criteria).

At 2816, the managing computing device may determine the best bid (e.g., the highest bid or lowest bid, depending on the context) and may send the best bid to computing device 1 for approval. In some embodiments, the managing computing device may be configured as discussed above with reference to the computing device 200, and determining the best bid may be performed in accordance with the operations described above with reference to the negotiation evaluation logic 210. The process may then end.

The following paragraphs provide examples of embodiments of the present disclosure. Example 1 is one or more non-transitory computer readable media having instructions thereon that, in response to execution by one or more processing devices of a first computing device, cause the first computing device to: determine that a second computing device is within a predetermined proximity of the first computing device; cause the transmission of negotiation initiation data to the second computing device in response to the determination that the second computing device is within the predetermined proximity of the first computing device, wherein the second computing device provides a visual display of at least some of the negotiation initiation data in response to receiving the negotiation initiation data; receive negotiation response data provided by the second computing device; determine that the negotiation response data meets negotiation evaluation criteria; and cause the transmission of a confirmation message to the second computing device in response to a determination that the negotiation response data meets the negotiation evaluation criteria.

Example 2 may include the subject matter of Example 1, and may further have instructions stored thereon that, in response to execution by the one or more processing devices of the first computing device, cause the first computing device to, prior to causation of the transmission of negotiation initiation data to the second computing device, receive at least some of the negotiation initiation data from a user of the first computing device via an input device of the first computing device.

Example 3 may include the subject matter of any of Examples 1-2, and may further have instructions stored thereon that, in response to execution by the one or more processing devices of the first computing device, cause the first computing device to receive inventory information via a wired communication pathway between the first computing device and a remote computing device.

Example 4 may include the subject matter of any of Examples 1-3, and may further specify that the determination that the second computing device is within the predetermined proximity of the first computing device is at least in part in response to a determination that the second computing device is enabled with a predetermined wireless communication capability, the predetermined wireless communication capability selected from the group consisting of Wi-Fi communication capability, Bluetooth communication capability, and Near Field Communication (NFC) communication capability.

Example 5 may include the subject matter of any of Examples 1-4, and may further specify that the determination that the second computing devices within the predetermined proximity of the first computing device is at least in part in response to a determination that the second computing device is enabled with a predetermined security capability.

Example 6 may include the subject matter of Example 5, and may further specify that the predetermined security capability is selected from the group consisting of Software Guard Extensions (SGX), Converge Security and Manageability Engine (CSME), and secure enclaves.

Example 7 may include the subject matter of any of Examples 1-6, and may further specify that the first computing device is a mobile computing device and the second computing device is a fixed point-of-sale terminal.

Example 8 may include the subject matter of any of Examples 1-7, and may further have instructions stored thereon that, in response to execution by the one or more processing devices of the first computing device, cause the first computing device to: determine that a third computing device is within the predetermined proximity of the first computing device, the third computing device different from the second computing device; cause the transmission of negotiation initiation data to the third computing device, wherein the third computing device provides a visual display at least some of the negotiation initiation data in response to receiving the negotiation initiation data; and receive negotiation response data provided by the third computing device; wherein the negotiation evaluation criteria are based at least in part on the negotiation response data provided by the third computing device.

Example 9 may include the subject matter of Example 8, and may further specify that the negotiation response data provided by the third computing device comprises a threshold offer value, and the negotiation evaluation criteria comprises exceeding the threshold offer value.

Example 10 may include the subject matter of any of Examples 1-9, and may further have instructions stored thereon that, in response to execution by the one or more processing devices of the first computing device, cause the first computing device to: prior to causation of the transmission of negotiation initiation data to the second computing device, receive the negotiation initiation data from a third computing device within the predetermined proximity of the first computing device, wherein the third computing device is different from the second computing device; wherein causation of the transmission of negotiation initiation data to the second computing device is in response to a determination that the first computing device has more residual energy than the third computing device.

Example 11 is a computing device for proximity-based inter-computing device negotiation, including: proximity logic to determine that a second computing device is within a predetermined proximity of the computing device; negotiation initiation logic coupled with the proximity logic to cause transmission of negotiation initiation data to the second computing device for visual display of at least some of the negotiation initiation data at the second computing device, in response to the determination by the proximity logic that the second computing device within the predetermined proximity of the computing device; negotiation evaluation logic to determine that negotiation response data, provided by the second computing device in response to receipt of the negotiation initiation data, meets negotiation evaluation criteria; and communication logic coupled with the negotiation logic to cause the transmission of a confirmation message to the second computing device in response to a determination by the negotiation evaluation logic that the negotiation response data meets the negotiation evaluation criteria.

Example 12 may include the subject matter of Example 11, and may further specify that the computing device is a stationary point-of-sale terminal.

Example 13 may include the subject matter of any of Examples 11-12, and may further specify that the computing device is wired to a communication network.

Example 14 may include the subject matter of any of Examples 11-13, and may further specify that the proximity logic is to determine that the second computing device is enabled with a predetermined wireless communication capability, the predetermined wireless communication capability selected from the group consisting of Wi-Fi communication capability, Bluetooth communication capability, and Near Field Communication (NFC) communication capability.

Example 15 may include the subject matter of Example 14, and may further specify that the proximity logic is to determine that the second computing device is within the predetermined proximity of the computing device at least in part in response to the determination that the second computing device is enabled with the predetermined wireless communication capability.

Example 16 may include the subject matter of any of Examples 11-15, and may further specify that the proximity logic is to determine that the second computing device is enabled with a predetermined security capability, and wherein the proximity logic is to determine that the second computing device is within the predetermined proximity of the computing device at least in part in response to the determination that the second computing device is enabled with the predetermined security capability.

Example 17 may include the subject matter of any of Examples 11-16, and may further specify that the computing device is a mobile computing device.

Example 18 may include the subject matter of any of Examples 11-17, and may further specify that: the proximity logic is to determine that a third computing device is within the predetermined proximity of the computing device, the third computing device different from the second computing device; the negotiation initiation logic is to cause transmission of second negotiation initiation data to the third computing device, wherein the third computing device provides a visual display of at least some of the negotiation initiation data in response to receipt of the second negotiation initiation data; and the negotiation evaluation criteria are based at least in part on negotiation response data provided by the third computing device.

Example 19 may include the subject matter of any of Examples 11-18, and may further specify that: the negotiation initiation logic is to, prior to causation of the transmission of the negotiation initiation data to the second computing device, receive the negotiation initiation data from a third computing device within the predetermined proximity of the first computing device, wherein the third computing device is different from the second computing device; and the negotiation initiation logic is to cause the transmission of the negotiation initiation data to the second computing device in response to a determination that the first computing device has more residual energy than the third computing device.

Example 20 is a method for computing device negotiation, including: determining, by a first computing device, that a second computing device is within a predetermined proximity of the first computing device; causing, by the first computing device, the transmission of negotiation initiation data to the second computing device in response to the determination that the second computing device is within the predetermined proximity of the first computing device, wherein the second computing device provides a visual display of at least some of the negotiation initiation data in response to receiving the negotiation initiation data; receiving, by the first computing device, negotiation response data provided by the second computing device; determining, by the first computing device, that the negotiation response data meets negotiation evaluation criteria; and causing, by the first computing device, the transmission of a confirmation message to the second computing device in response to determining that the negotiation response data meets the negotiation evaluation criteria.

Example 21 may include the subject matter of Example 20, and may further specify that the first computing device is a stationary point-of-sale terminal.

Example 22 may include the subject matter of any of Examples 20-21, and may further specify that determining that the second computing device is within the predetermined proximity of the first computing device is performed at least in part in response to determining that the second computing device is enabled with a predetermined wireless communication capability, the predetermined wireless communication capability selected from the group consisting of Wi-Fi communication capability, Bluetooth communication capability, and Near Field Communication (NFC) communication capability.

Example 23 may include the subject matter of any of Examples 20-22, and may further specify that the first computing device is a mobile computing device and the second computing device is a fixed point-of-sale terminal.

Example 24 may include the subject matter of any of Examples 20-23, and may further include: determining, by the first computing device, that a third computing device is within the predetermined proximity of the first computing device, the third computing device different from the second computing device; causing, by the first computing device, the transmission of negotiation initiation data to the third computing device in response to the determination that the third computing device is within a predetermined proximity of the first computing device, wherein the third computing device provides a visual display of at least some of the negotiation initiation data in response to receiving the negotiation initiation data; and receiving, by the first computing device, negotiation response data provided by the third computing device; wherein the negotiation evaluation criteria are based at least in part on the negotiation response data provided by the third computing device.

Example 25 may include the subject matter of any of Examples 20-24, and may further include: prior to causing the transmission of the negotiation initiation data to the second computing device, receiving, by the first computing device, the negotiation initiation data from a third computing device within the predetermined proximity of the first computing device, wherein the third computing device is different from the second computing device; wherein causing the transmission of the negotiation initiation data to the second computing device is performed in response to a determination that the first computing device has more residual energy than the third computing device.

Example 26 may include the method of operation of any of the computing devices of Examples 1-19.

Example 27 may include means for performing the method of any of Examples 20-26.

Example 28 is one or more computer readable media having instructions thereon which, in response to execution by one or more processing devices of an apparatus, cause the apparatus to perform the method of any of Examples 20-26.

What is claimed is:

1. One or more non-transitory computer readable media (NTCRM) comprising instructions, wherein execution of the instructions by one or more processing devices of a first computing device is to cause the first computing device to:
cause transmission of capability information to a third computing device within a predetermined proximity to the first computing device, the capability information indicating one or more of a residual energy of the first computing device, a signal strength capability of the first computing device, and currently available processing resources at the first computing device;
receive, from the third computing device, a message including negotiation initiation data and an indicator indicating that the first computing device was selected to act as a manager device to manage the negotiation, wherein the selection of the first computing device to act as the manager device is based a determination, based on the capability information, that one or more of the first computing device has more residual energy than the third computing device, that the first computing device has a signal strength capability that is greater than a signal strength capability of the third computing device, and the currently available processing resources at the first computing device are greater than currently available processing resources at the third computing device;
determine, in response to receipt of the indicator, whether the first computing device is to act as the manager device based on selection criteria, the selection criteria being receipt of the indicator or is based on a user input indicating acceptance or non-acceptance of management of the negotiation;
determine, in response to determining that the first computing device is to act as the manager device, one or more second computing devices that are within a predetermined proximity of the first computing device, wherein the one or more second computing devices are different from the third computing device;
cause transmission of the negotiation initiation data to the one or more second computing devices when the one or more second computing devices are within the predetermined proximity of the first computing device, wherein the negotiation initiation data is to cause the one or more second computing devices to provide a visual display of at least some of the negotiation initiation data including an image or a text description of a subject of the negotiation, and the negotiation initiation data at least includes a notification that another computing device wishes to initiate a negotiation with the one or more second computing devices, the other computing device being the first computing device, one of the second computing devices, or the third computing device;
receive negotiation response data provided by the one or more second computing devices;
determine that the negotiation response data meets negotiation evaluation criteria; and
cause transmission of a confirmation message to the one or more second computing devices when the negotiation response data meets the negotiation evaluation criteria.

2. The one or more NTCRM of claim 1, wherein the determination that the one or more second computing devices are within the predetermined proximity of the first computing device is based at least in part in response to a determination that the one or more second computing devices are enabled with a predetermined security capability.

3. The one or more NTCRM of claim 2, wherein the predetermined security capability is selected from the group consisting of Software Guard Extensions (SGX), Converge Security and Manageability Engine (CSME), and secure enclaves.

4. The one or more NTCRM of claim 1, wherein the first computing device is a mobile computing device, at least one of the second computing devices is another mobile computing device, the third computing device or at least one of the one or more second computing devices is a fixed point-of-sale terminal.

5. The one or more NTCRM of claim 1, wherein the negotiation response data comprises a threshold offer value, and the negotiation evaluation criteria further comprises exceeding the threshold offer value.

6. The one or more NTCRM of claim 1, wherein when the first device is to act as the manager device, execution of the instructions is to cause the first computing device to:
perform secure attestation of the one or more second computing devices.

7. The one or more NTCRM of claim 1, wherein execution of the instructions is to cause the first computing device to:
cause transmission of a message to a remote computing device, the message to query the remote computing device for selection of the first computing device or another computing device to act as the manager device.

8. A first computing device for proximity-based inter-computing device negotiation, comprising:
processor circuitry arranged to operate proximity logic to:
determine that one or more second computing devices and a third computing device are within a predetermined proximity of the first computing device, wherein the third computing device is different than the one or more second computing devices, and
perform secure attestation of the one or more second computing devices in response to a determination that the first computing device is to act as a manager device to manage a negotiation;
the processor circuitry arranged to operate negotiation initiation logic, coupled with the proximity logic, to:
cause transmission of capability information to the third computing device, the capability information indicating one or more of a residual energy of the first computing device, a signal strength capability of the first computing device, and currently available processing resources at the first computing device;
receive, from the third computing device, a message including negotiation initiation data and an indicator indicating that the first computing device was selected to act as a manager device to manage the negotiation, wherein the selection of the first computing device to act as the manager device is based a determination, based on the capability information, that one or more of the first computing device has more residual energy than the third computing device, that the first computing device has a signal strength capability that is greater than a signal strength capability of the third computing device, and the currently available processing resources at the first computing device are greater than currently available processing resources at the third computing device;

determine, in response to receipt of the indicator, whether the first device is to act as the manager device the determination of whether the first computing device is to act as the manager device is based on selection criteria, the selection criteria being receipt of the indicator or is based on a user input indicating acceptance or non-acceptance of management of the negotiation, and in response to the determination by the proximity logic that the one or more second computing devices are within the predetermined proximity of the computing device and based on the determination that the first computing device will act as the manager device, cause transmission of the negotiation initiation data to the one or more second computing devices, wherein the negotiation initiation data is to cause the one or more second computing devices to provide a visual display of at least some of the negotiation initiation data including an image or a text description of a subject of the negotiation, and the negotiation initiation data at least includes a notification that another computing device wishes to initiate a negotiation with the one or more second computing devices, the other computing device being the first computing device, one of the second computing devices, or the third computing device;

the processor circuitry arranged to operate negotiation evaluation logic to determine that negotiation response data, provided by the one or more second computing devices in response to receipt of the negotiation initiation data, meets negotiation evaluation criteria; and the processor circuitry arranged to operate negotiation response logic coupled with negotiation evaluation logic, the negotiation response logic to control communication circuitry to cause transmission of a confirmation message to the one or more second computing devices in response to a determination by the negotiation evaluation logic that the negotiation response data meets the negotiation evaluation criteria.

9. The first computing device of claim 8, wherein the proximity logic is to determine that the one or more second computing devices are enabled with a predetermined security capability, and wherein the proximity logic is to determine that the one or more second computing devices are within the predetermined proximity of the computing device at least in part in response to the determination that the one or more second computing devices are enabled with the predetermined security capability.

10. The first computing device of claim 8, wherein the first computing device is a mobile computing device, at least one of the second computing devices is another mobile computing device, and the third computing device or at least one of the one or more second computing devices is a fixed point-of-sale terminal.

11. A method for computing device negotiation, comprising:

transmitting, by a first computing device, capability information to a third computing device within a predetermined proximity to the first computing device, the capability information indicating one or more of a residual energy of the first computing device, a signal strength capability of the first computing device, and currently available processing resources at the first computing device;

receiving, by the first computing device from the third computing device, a message including negotiation initiation data and an indicator indicating that the first computing device was selected to act as a manager device to manage the negotiation, wherein the selection of the first computing device to act as the manager device is based a determination, based on the capability information, that one or more of the first computing device has more residual energy than the third computing device, that the first computing device has a signal strength capability that is greater than a signal strength capability of the third computing device, and the currently available processing resources at the first computing device are greater than currently available processing resources at the third computing device;

determining, by the first computing device in response to receipt of the indicator, whether the first computing device is to act as the manager device based on selection criteria, the selection criteria being receipt of the indicator or is based on a user input indicating acceptance or non-acceptance of management of the negotiation;

determining, by the first computing device in response to determining that the first computing device is to act as the manager device, that one or more second computing devices are within a predetermined proximity of the first computing device, wherein the one or more second computing devices are different from the third computing device;

performing, by the first computing device, secure attestation of the one or more second computing devices in response to a determination that the first computing device is to act as the manager device;

transmitting, by the first computing device, the negotiation initiation data to the one or more second computing devices in response to the determination that the one or more second computing devices are within the predetermined proximity of the first computing device, the negotiation initiation data is to cause the one or more second computing devices to provide a visual display of at least some of the negotiation initiation data including an image or a text description of a subject of the negotiation, and the negotiation initiation data at least includes a notification that another computing device wishes to initiate a negotiation with the one or more second computing devices, the other computing device being the first computing device, one of the second computing devices, or the third computing device;

receiving, by the first computing device, negotiation response data provided by the one or more second computing devices;

determining, by the first computing device, that the negotiation response data meets negotiation evaluation criteria; and transmitting, by the first computing device, a confirmation message to the one or more second computing devices in response to determining that the negotiation response data meets the negotiation evaluation criteria.

12. The method of claim 11, wherein the first computing device is a mobile computing device and at least one of the one or more second computing devices is a fixed point-of-sale terminal.

13. The method of claim 11, further comprising:

determining, by the first computing device, that a fourth computing device is within the predetermined proximity of the first computing device, the fourth computing device different from the third computing device and the one or more second computing devices;

transmitting, by the first computing device, negotiation initiation data to the fourth computing device in response to the determination that the fourth computing device is within a predetermined proximity of the first computing device, wherein the negotiation initiation data is to cause the fourth computing device to provide a visual display of at least some of the negotiation initiation data including an image or a text description of a subject of the negotiation; and receiving, by the first computing device, negotiation response data provided by the fourth computing device;

wherein the negotiation evaluation criteria are based at least in part on the negotiation response data provided by the fourth computing device.

14. The method of claim 11, further comprising:

prior to causing the transmission of the negotiation initiation data to the one or more second computing devices, receiving, by the first computing device, the negotiation initiation data from a third computing device within the predetermined proximity of the first computing device, wherein the third computing device is different from the one or more second computing devices;

wherein causing the transmission of the negotiation initiation data to the one or more second computing devices is performed in response to a determination that the first computing device has more residual energy than the third computing device.

15. The method of claim 11, further comprising:

transmitting, by the first computing device, another message to a remote computing device, the other message to query the remote computing device for selection of the first computing device or another computing device to act as the manager device, and the remote computing device is part of a cloud computing service.

* * * * *

UNITED STATES PATENT AND TRADEMARK OFFICE
CERTIFICATE OF CORRECTION

PATENT NO. : 10,565,640 B2  
APPLICATION NO. : 14/316686  
DATED : February 18, 2020  
INVENTOR(S) : Rajesh Poornachandran et al.

Page 1 of 1

It is certified that error appears in the above-identified patent and that said Letters Patent is hereby corrected as shown below:

In the Claims

Column 32  
Line 64-65, Claim 8 "…is based a determination…" should read – "…is based on a determination…"

Column 33  
Line 10, Claim 8 "device the…" should read – "device, the…"

Column 34  
Line 11, Claim 11 "…is based a determination…" should read – "…is based on a determination…"

Signed and Sealed this  
Twelfth Day of May, 2020

Andrei Iancu  
*Director of the United States Patent and Trademark Office*